United States Patent
Mitsutani

(10) Patent No.: US 10,914,204 B2
(45) Date of Patent: Feb. 9, 2021

(54) VALVE TIMING ADJUSTMENT DEVICE

(71) Applicant: DENSO CORPORATION, Kariya (JP)

(72) Inventor: Tetsuro Mitsutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/502,361

(22) Filed: Jul. 3, 2019

(65) Prior Publication Data

US 2019/0323388 A1 Oct. 24, 2019

Related U.S. Application Data

(63) Continuation of application No. PCT/JP2018/001362, filed on Jan. 18, 2018.

(30) Foreign Application Priority Data

Jan. 19, 2017 (JP) ................................. 2017-007514

(51) Int. Cl.
*F01L 1/34* (2006.01)
*F01L 1/344* (2006.01)
(Continued)

(52) U.S. Cl.
CPC ............. *F01L 1/3442* (2013.01); *F01L 1/356* (2013.01); *F15B 11/10* (2013.01);
(Continued)

(58) Field of Classification Search
CPC ..................... F01L 1/3442; F01L 1/356; F01L 2001/34426; F16K 11/0716;
(Continued)

(56) References Cited

U.S. PATENT DOCUMENTS

| 8,689,749 B2 * | 4/2014 | Suzuki ................. F01L 1/3442 |
| | | 123/90.17 |
| 2009/0133652 A1 | 5/2009 | Fujyoshi et al. |
| 2012/0152195 A1 | 6/2012 | Schulze et al. |

FOREIGN PATENT DOCUMENTS

| DE | 10 2011 000 591 A1 | 8/2012 |
| WO | 2018/135577 | 7/2018 |

(Continued)

OTHER PUBLICATIONS

U.S. Appl. No. 16/502,333 of Mitsutani, filed Jul. 3, 2019 (57 pages).

(Continued)

*Primary Examiner* — Zelalem Eshete
(74) *Attorney, Agent, or Firm* — Nixon & Vanderhye P.C.

(57) ABSTRACT

A sleeve includes: a supply port communicated with a hydraulic oil supply source; a primary control port communicated with a retard chamber, a secondary control port communicated with an advance chamber; and a drain port communicated with an outside of a valve timing adjustment device. A spool includes: a pressure accumulation space formed at an inside of the spool; a supply passage configured to connect between the pressure accumulation space and the supply port; a primary control passage configured to connect between the pressure accumulation space and the primary control port; a secondary control passage configured to connect between the pressure accumulation space and the secondary control port; and a recycle passage configured to connect between the primary control port or the secondary control port and the pressure accumulation space. The recycle passage and the drain port are connected with each other at the inside of the sleeve.

9 Claims, 10 Drawing Sheets

(51) Int. Cl.
  *F01L 1/356*  (2006.01)
  *F15B 11/10*  (2006.01)
  *F15B 13/04*  (2006.01)
  *F15B 15/12*  (2006.01)
  *F16K 11/07*  (2006.01)
  *F16K 31/06*  (2006.01)

(52) U.S. Cl.
  CPC .......... *F15B 13/0402* (2013.01); *F15B 15/12* (2013.01); *F16K 11/0716* (2013.01); *F01L 2001/34426* (2013.01); *F15B 2211/411* (2013.01); *F15B 2211/7058* (2013.01); *F16K 31/0613* (2013.01)

(58) Field of Classification Search
  CPC ...... F16K 31/0613; F15B 11/10; F15B 15/12; F15B 2211/7058; F15B 2211/411
  See application file for complete search history.

(56) References Cited

FOREIGN PATENT DOCUMENTS

| | | |
|---|---|---|
| WO | 2018/135584 | 7/2018 |
| WO | 2018/135586 | 7/2018 |
| WO | 2018/164022 | 9/2018 |
| WO | 2018/194076 | 10/2018 |

OTHER PUBLICATIONS

U.S. Appl. No. 16/502,376 of Mitsutani, filed Jul. 3, 2019 (35 pages).
U.S. Appl. No. 16/502,404 of Mitsutani, et al. filed Jul. 3, 2019 (100 pages).
U.S. Appl. No. 16/542,460 of Mitsutani, filed Aug. 16, 2019 (66 pages).
U.S. Appl. No. 16/555,122 of Mitsutani, filed Aug. 29, 2019 (61 pages).

* cited by examiner

VALVE TIMING ADJUSTMENT DEVICE

CROSS REFERENCE TO RELATED APPLICATIONS

This application is a continuation application of International Patent Application No. PCT/JP2018/001362 filed on Jan. 18, 2018, which designated the U.S. and claims the benefit of priority from Japanese Patent Application No. 2017-7514 filed on Jan. 19, 2017. The entire disclosures of all of the above applications are incorporated herein by reference.

TECHNICAL FIELD

The present disclosure relates to a valve timing adjustment device.

BACKGROUND

There is known a valve timing adjustment device that is installed in a drive force transmission path for transmitting a drive force from a drive shaft to a driven shaft of an internal combustion engine and adjusts a valve timing of an intake valve and a valve timing of an exhaust valve that is driven to open and close by the driven shaft. In a case where the valve timing adjustment device is a hydraulic type, the valve timing adjustment device includes: a housing that is rotated synchronously with one of the drive shaft and the driven shaft; and a vane rotor that is fixed to an end portion of the other one of the drive shaft and the driven shaft. The valve timing adjustment device rotates the vane rotor in an advancing direction or a retarding direction relative to the housing by supplying hydraulic oil to one of a primary hydraulic chamber and a secondary hydraulic chamber defined by the vane rotor in the inside of the housing. The hydraulic oil is supplied through a passage change valve.

SUMMARY

According to one aspect of the present disclosure, there is provided a valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft. The valve timing adjustment device includes a housing, a vane rotor, a sleeve and a spool. The sleeve is shaped in a tubular form and includes: a supply port, which is communicated with a hydraulic oil supply source; a primary control port, which is communicated with a primary hydraulic chamber; a secondary control port, which is communicated with a secondary hydraulic chamber; and a drain port, which is communicated with an outside of the valve timing adjustment device. The spool is shaped in a tubular form and is configured to reciprocate in an axial direction of the spool at an inside of the sleeve. The spool includes: a pressure accumulation space, which is formed at an inside of the spool; a supply passage, which is configured to connect between the pressure accumulation space and the supply port; a primary control passage, which is configured to connect between the pressure accumulation space and the primary control port; a secondary control passage, which is configured to connect between the pressure accumulation space and the secondary control port; and a recycle passage, which is configured to connect between the primary control port or the secondary control port and the pressure accumulation space. The recycle passage and the drain port are connected with each other at the inside of the sleeve.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
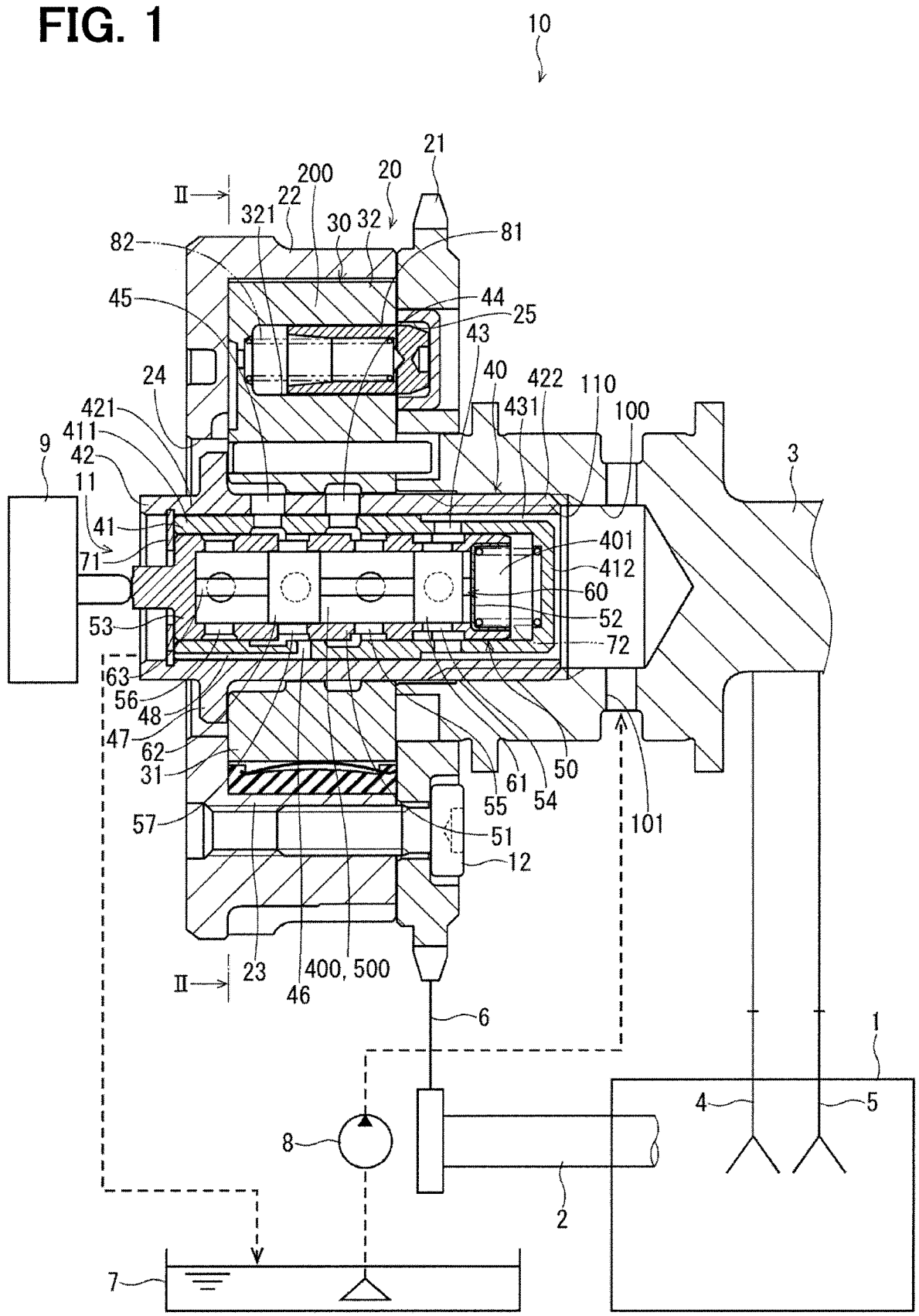
FIG. 1 is a cross-sectional view illustrating a valve timing adjustment device according to a first embodiment of the present disclosure.

For example, in a previously proposed valve timing adjustment device, a sleeve of a passage change valve includes: a supply port that is configured to supply hydraulic oil to a pressure accumulation space formed at an inside of a spool; a primary control port, which is communicated with a primary hydraulic chamber; a secondary control port, which is communicated with a secondary hydraulic chamber; a primary drain port, which is configured to discharge the hydraulic oil from the primary hydraulic chamber to an outside; a secondary drain port, which is configured to discharge the hydraulic oil from the secondary hydraulic chamber to the outside; a primary recycle port, which is configured to return the hydraulic oil from the primary hydraulic chamber to the pressure accumulation space; and a secondary recycle port, which is configured to return the hydraulic oil from the secondary hydraulic chamber to the pressure accumulation space. The above-described two types of recycle ports enable reuse of the hydraulic oil discharged from the primary hydraulic chamber and the hydraulic oil discharged from the secondary hydraulic chamber.

Recycle valves are installed between an inner wall of the sleeve and an outer wall of the spool such that each of the recycle valves enables a flow of the hydraulic oil from the primary recycle port or the secondary recycle port toward the pressure accumulation space and limits a flow of the hydraulic oil from the pressure accumulation space toward the primary recycle port or the secondary recycle port. Thereby, it is possible to limit a backflow of the hydraulic oil from the pressure accumulation space toward the respective recycle ports. As a result, in the structure that enables the reuse of the hydraulic oil, the responsiveness of the valve timing adjustment device can be increased.

In the previously proposed valve timing adjustment device, the sleeve has the supply port, the primary drain port, the primary control port, the primary recycle port, the secondary recycle port, the secondary control port, and the secondary drain port, which are arranged one after the other in the axial direction of the sleeve. As a result, an axial size of the sleeve becomes large, and thereby a size of the passage change valve may possibly be increased.

According to the present disclosure, there is provided a valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft. The valve timing adjustment device includes a housing, a vane rotor, a sleeve, a spool and a recycle check valve.

One of the drive shaft and the driven shaft is defined as a first shaft while the other one of the drive shaft and the driven shaft is defined as a second shaft. The housing is configured to be rotated synchronously with the first shaft, and the housing is configured to be fitted to an end portion of the second shaft and is configured to be rotatably supported by the second shaft.

The vane rotor is configured to be fixed to the end portion of the second shaft and includes a vane that partitions an inside space of the housing into a primary hydraulic chamber and a secondary hydraulic chamber while the primary hydraulic chamber is located on one side of the vane in a circumferential direction, and the secondary hydraulic chamber is located on the other side of the vane in the circumferential direction. The vane rotor is configured to be rotated relative to the housing depending on a pressure of hydraulic oil supplied from a hydraulic oil supply source to the primary hydraulic chamber and a pressure of the hydraulic oil supplied from the hydraulic oil supply source to the secondary hydraulic chamber.

The sleeve is shaped in a tubular form and includes: a supply port, which is communicated with the hydraulic oil supply source; a primary control port, which is communicated with the primary hydraulic chamber; a secondary control port, which is communicated with the secondary hydraulic chamber; and a drain port, which is communicated with an outside of the valve timing adjustment device.

The spool is shaped in a tubular form and is configured to reciprocate in an axial direction of the spool at an inside of the sleeve. The spool includes: a pressure accumulation space, which is formed at an inside of the spool; a supply passage, which is configured to connect between the pressure accumulation space and the supply port; a primary control passage, which is configured to connect between the pressure accumulation space and the primary control port; a secondary control passage, which is configured to connect between the pressure accumulation space and the secondary control port; and a recycle passage, which is configured to connect between the primary control port or the secondary control port and the pressure accumulation space. The recycle passage enables reuse of the hydraulic oil discharged from the primary hydraulic chamber and the hydraulic oil discharged from the secondary hydraulic chamber.

The recycle check valve is placed at the inside of the spool and is configured to enable a flow of the hydraulic oil from the recycle passage toward the pressure accumulation space and is configured to limit a flow of the hydraulic oil from the pressure accumulation space toward the recycle passage. Thereby, it is possible to limit a backflow of the hydraulic oil from the pressure accumulation space toward the recycle passage. As a result, in the structure that enables the reuse of the hydraulic oil, the responsiveness of the valve timing adjustment device can be increased.

In the present disclosure, the recycle passage and the drain port are connected with each other at the inside of the sleeve. Therefore, unlike the previously proposed technique, the sleeve does not need to have the recycle port, which is different from the drain port and is used to return the hydraulic oil from the respective hydraulic chambers to the pressure accumulation space. As a result, an axial size of the sleeve can be made small, and thereby the passage change valve can be made small.

Hereinafter, a valve timing adjustment device according to a plurality of embodiments of the present disclosure will be described with reference to the drawings. Components that are substantially the same in the plurality of embodiments are denoted by the same reference signs and will not be described redundantly.

First Embodiment

FIG. 1 illustrates a valve timing adjustment device according to a first embodiment of the present disclosure. The valve timing adjustment device 10 changes a rotational phase of a camshaft 3 relative to a crankshaft 2 of an engine 1 (serving as an internal combustion engine), so that the valve timing adjustment device 10 adjusts a valve timing of intake valves 4 among the intake valves 4 and exhaust valves 5 driven to open and close by the camshaft 3. The valve timing adjustment device 10 is installed in a drive force transmission path that extends from the crankshaft 2 to the camshaft 3. The crankshaft 2 corresponds to a drive shaft. The camshaft 3 corresponds to a driven shaft.

The structure of the valve timing adjustment device 10 will be described with reference to FIGS. 1 and 2.

The valve timing adjustment device 10 includes a housing 20, a vane rotor 30, and a passage change valve 11.

The housing 20 includes a sprocket 21 and a case 22. The sprocket 21 is fitted to an end portion of the camshaft 3. The camshaft 3 rotatably supports the sprocket 21. A chain 6 is wound around the sprocket 21 and the crankshaft 2. The sprocket 21 is rotated synchronously with the crankshaft 2. The case 22 is shaped in a bottomed tubular form. The case 22 is fixed to the sprocket 21 by bolts 12 while an opening end of the case 22 contacts the sprocket 21. The case 22 forms a plurality of partition wall portions 23 that inwardly project in the radial direction. An opening 24 is formed at a center of a bottom of the case 22 such that the opening 24 opens to a space, which is located at the outside of the case 22. The opening 24 is located on an opposite side of the vane rotor 30, which is opposite to the camshaft 3.

The vane rotor 30 has a boss 31 and a plurality of vanes 32. The boss 31 is shaped in a tubular form and is fixed to the end portion of the camshaft 3. Each of the vanes 32 outwardly projects from the boss 31 in the radial direction and is placed between corresponding adjacent two of the partition wall portions 23. An inside space 200 of the housing 20 is divided into retard chambers 201 and advance chambers 202 by the vanes 32. Each of the retard chambers 201 corresponds to a primary hydraulic chamber and is positioned on one side of the corresponding vane 32 in the circumferential direction. Each of the advance chambers 202 corresponds to a secondary hydraulic chamber and is positioned on the other side of the corresponding vane 32 in the circumferential direction. The vane rotor 30 rotates relative to the housing 20 in a retarding direction or an advancing direction according to an oil pressure in the respective retard chambers 201 and an oil pressure in the respective advance chambers 202.

The passage change valve 11 has a sleeve 40, a spool 50 and a check valve 60.

The sleeve 40 has an inner sleeve 41, an outer sleeve 42, a plurality of supply ports 43, a plurality of primary control ports 44, a plurality of secondary control ports 45, a drain port 46 and a retaining portion 47.

The inner sleeve 41 is made of metal, such as aluminum, which has relatively low hardness. The inner sleeve 41 has a sleeve tube 411 and a sleeve bottom 412. The sleeve tube 411 is shaped in a substantially cylindrical tubular form. The sleeve bottom 412 is integrally formed with the sleeve tube 411 in one piece such that the sleeve bottom 412 closes one end of the sleeve tube 411.

The outer sleeve 42 is made of metal, such as iron. The outer sleeve 42 has a sleeve tube 421 and a threaded portion 422. The sleeve tube 421 is shaped in a substantially cylindrical tubular form. The threaded portion 422 is formed at an outer wall of one end portion of the sleeve tube 421.

The inner sleeve 41 is placed at an inside of the outer sleeve 42 such that the sleeve bottom 412 faces the threaded portion 422 side. An outer wall of the inner sleeve 41 is fitted to an inner wall of the outer sleeve 42. An inside space 400, which is shaped in a substantially cylindrical form, is formed at an inside of the sleeve tube 411 of the inner sleeve 41 placed at the inside of the sleeve tube 421 of the outer sleeve 42.

Each of the supply ports 43 is formed such that the supply port 43 connects between the outer wall and an inner wall of the sleeve tube 411 of the inner sleeve 41. The sleeve bottom 412 side end region of the sleeve tube 411 of the inner sleeve 41 has an outer diameter that is smaller than an inner diameter of the sleeve tube 421. As a result, an annular passage 431, which is an annular oil passage, is formed between the outer wall of the sleeve tube 411 and the inner wall of the sleeve tube 421. The inside space 400 is communicated with the space at the outside of the sleeve 40 through the supply ports 43 and the annular passage 431.

Each of the primary control ports 44 is formed such that the primary control port 44 connects between the outer wall of the sleeve tube 421 of the outer sleeve 42 and the inner wall of the sleeve tube 411 of the inner sleeve 41. The plurality of primary control ports 44 is arranged one after the other in the circumferential direction of the sleeve 40.

Each of the secondary control ports 45 is formed such that the secondary control port 45 connects between the outer wall of the sleeve tube 421 of the outer sleeve 42 and the inner wall of the sleeve tube 411 of the inner sleeve 41. The plurality of secondary control ports 45 is arranged one after the other in the circumferential direction of the sleeve 40.

The supply ports 43, the primary control ports 44 and the secondary control ports 45 are arranged in this order at predetermined intervals from one end side to the other end side of the sleeve 40.

The drain port 46 is formed to connect between the outer wall and an inner wall of the sleeve tube 411 of the inner sleeve 41.

A sleeve-inside passage 48 is formed at the sleeve tube 411 of the inner sleeve 41. The sleeve-inside passage 48 is radially inwardly recessed from the outer wall of the sleeve tube 411 and extends from the drain port 46 in the axial direction of the sleeve tube 411. Therefore, in the state where the inner sleeve 41 is installed at the inside of the outer sleeve 42, the sleeve-inside passage 48 is formed between the inner sleeve 41 and the outer sleeve 42, that is, the sleeve-inside passage 48 is formed within a range of a wall thickness of the sleeve 40.

The drain port 46 is communicated with the opposite side of the passage change valve 11, which is opposite to the camshaft 3, through the sleeve-inside passage 48, i.e., the drain port 46 is communicated with the outside of the valve timing adjustment device 10 through the sleeve-inside passage 48.

The retaining portion 47 is shaped in a ring form and radially outwardly projects from the outer wall of the other end portion of the sleeve tube 421.

A shaft hole 100 and supply holes 101 are formed at an end portion of the camshaft 3 located on the valve timing adjustment device 10 side. The shaft hole 100 is formed to extend in an axial direction of the camshaft 3 from a center part of an end surface of the camshaft 3, which is located on the valve timing adjustment device 10 side. Each of the supply holes 101 is formed such that the supply hole 101 inwardly extend from an outer wall of the camshaft 3 in the radial direction and is communicated with the shaft hole 100.

A shaft-side threaded portion 110 is formed at an inner wall of the shaft hole 100 of the camshaft 3 to threadably engage with the threaded portion 422 of the outer sleeve 40.

The sleeve 40 is inserted through the inside of the boss 31 of the vane rotor 30 and is fixed to the camshaft 3 such that the threaded portion 422 of the sleeve 40 is engaged with the shaft-side threaded portion 110 of the camshaft 3. At this time, the retaining portion 47 of the sleeve 40 retains an end surface of the boss 31 of the vane rotor 30, which is opposite to the camshaft 3. In this way, the vane rotor 30 is fixed to the camshaft 3 such that the vane rotor 30 is held between the camshaft 3 and the retaining portion 47. The sleeve 40 is thus installed to the center of the vane rotor 30.

An oil pump 8 is connected to the supply holes 101. The oil pump 8 suctions the hydraulic oil stored in the oil pan 7 and supplies the suctioned hydraulic oil to the supply holes 101. As a result, the hydraulic oil flows into the shaft hole 100. Here, the oil pump 8 corresponds to a hydraulic oil supply source.

The hydraulic oil, which is supplied to the shaft hole 100, is conducted to the inside space 400 through the annular passage 431 and the supply ports 43.

In a state where the sleeve 40 is installed at the center of the vane rotor 30, the primary control ports 44 are communicated with the retard chambers 201 through retard passages 301 formed at the boss 31. Furthermore, the secondary control ports 45 are communicated with the advance chambers 202 through advance passages 302 formed at the boss 31.

The spool 50 has a spool tube 51, a spool cover 52, a spool bottom 53, a plurality of supply passages 54, a plurality of primary control passages 55, a plurality of secondary control passages 56 and a plurality of recycle passages 57.

The spool tube 51 is shaped in a substantially cylindrical tubular form. The spool cover 52 is formed such that the spool cover 52 closes one end portion of the spool tube 51. In the present embodiment, the spool cover 52 is formed separately from the spool tube 51. The spool bottom 53 is formed integrally with the spool tube 51 in one piece such that the spool bottom 53 closes the other end of the spool tube 51. A pressure accumulation space 500, which is shaped in a substantially cylindrical form, is formed by an inner wall of the spool tube 51, the spool cover 52 and the spool bottom 53.

Each of the supply passages 54 is formed such that the supply passage 54 connects between the inner wall of the spool tube 51 and an annular recess, which is formed at an outer wall of the spool tube 51. The supply passages 54 are arranged one after the other in the circumferential direction of the spool 50.

Each of the primary control passages 55 is formed such that the primary control passage 55 connects between the inner wall of the spool tube 51 and an annular recess, which is formed at the outer wall of the spool tube 51. The primary control passages 55 are arranged one after the other in the circumferential direction of the spool 50.

Each of the secondary control passages 56 is formed such that the secondary control passage 56 connects between the inner wall of the spool tube 51 and an annular recess, which is formed at the outer wall of the spool tube 51. The secondary control passages 56 are arranged one after the other in the circumferential direction of the spool 50.

Each of the recycle passages 57 is formed such that the recycle passage 57 connects between the inner wall of the spool tube 51 and an annular recess, which is formed at the outer wall of the spool tube 51. The recycle passages 57 are arranged one after the other in the circumferential direction of the spool 50.

The supply passage 54, the primary control passage 55, the recycle passage 57 and the secondary control passage 56 are arranged in this order at predetermined intervals from one end side to the other end side of the spool 50.

The spool 50 is provided at the inside of the sleeve 40, i.e., at the inside space 400 such that the spool cover 52 faces the sleeve bottom 412. The spool 50 can reciprocate in the axial direction of the spool 50 at the inside space 400.

A retaining portion 71 is located on a side of the spool tube 51 that is opposite to the sleeve bottom 412. The retaining portion 71 is shaped in a ring form, and an outer periphery of the retaining portion 71 is fitted to the inner wall of the outer sleeve 42. The retaining portion 71 can hold the end part of the spool tube 51, which is opposite to the spool bottom 53. In this way, removable of the spool 50 toward the side away from the sleeve bottom 412 is limited.

The spool 50 forms a variable volume space 401 between the spool cover 52 and the sleeve bottom 412 at the inside space 400 of the sleeve 40. A volume of the variable volume space 401 changes when the spool 50 is moved in the axial direction.

A spring 72 is installed between the spool cover 52 and the sleeve bottom 412. The spring 72 urges the spool 50 toward the retaining portion 71. In this way, the spool 50 is urged against the retaining portion 71.

A linear solenoid 9 is located on the opposite side of the spool 50, which is opposite to the camshaft 3. When the linear solenoid 9 is energized, the linear solenoid 9 urges the spool 50 toward the camshaft 3 against the urging force of the spring 72. As a result, the position of the spool 50 changes in the axial direction with respect to the sleeve 40. A movable range of the spool 50 extends from a position, at which the spool 50 contacts the retaining portion 71, to a position, at which the spool 50 contacts the sleeve bottom 412.

The supply passages 54 are communicated with the supply ports 43 regardless of the axial position of the spool 50 relative to the sleeve 40.

When the spool 50 is positioned to contact the retaining portion 71 (see FIG. 1), the primary control passages 55 are communicated with the primary control ports 44, and the secondary control ports 45 are communicated with the recycle passages 57. In this way, the oil pump 8 is connected to the retard chambers 201, and the advance chambers 202 are connected to the recycle passages 57.

When the spool 50 is positioned to contact the sleeve bottom 412, the secondary control passages 56 are communicated with the secondary control ports 45, and the primary control ports 44 are communicated with the recycle passages 57. In this way, the oil pump 8 is connected to the advance chambers 202, and the retard chambers 201 are connected to the recycle passages 57.

When the spool 50 is placed at an intermediate position between the retaining portion 71 and the sleeve bottom 412, the communications of the primary control passages 55, the recycle passages 57 and the secondary control passages 56 to the primary control ports 44 and the secondary control ports 45 are blocked. In this way, both of the retard chambers 201 and the advance chambers 202 are closed.

Figure 3A:
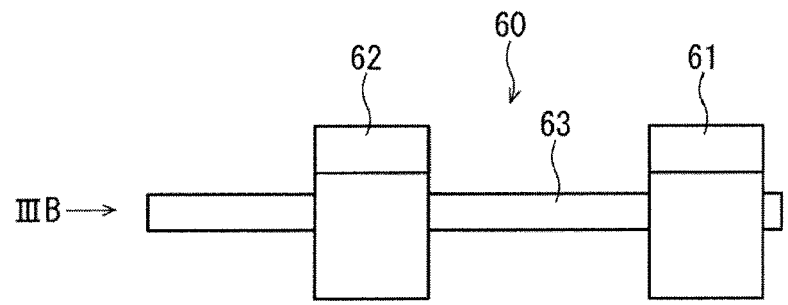
FIG. 3A is a diagram illustrating a check valve of the valve timing adjustment device according to the first embodiment of the present disclosure.
Figure 3B:
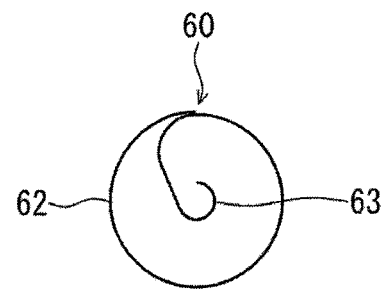
FIG. 3B is a view taken in a direction of an arrow IIIB in FIG. 3A.
Figure 3C:
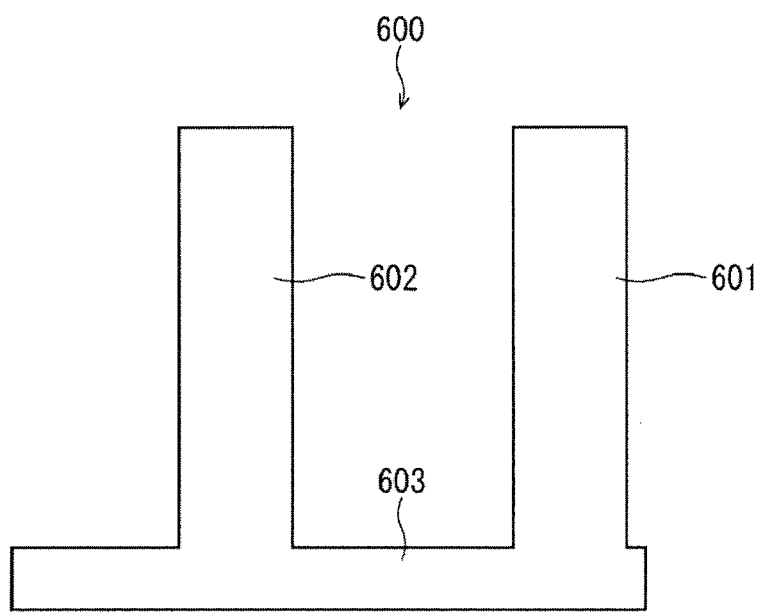
FIG. 3C is a developed view of the check valve.

As illustrated in FIGS. 3A to 3C, the check valve 60 has a supply check valve 61, a recycle check valve 62, and a shaft 63.

The check valve 60 is formed, for example, by rolling a thin plate 600 made of metal as illustrated in FIG. 3C. The thin plate 600 has a supply check valve corresponding portion 601, a recycle check valve corresponding portion 602, and a shaft corresponding portion 603. The supply check valve corresponding portion 601, the recycle check valve corresponding portion 602, and the shaft corresponding portion 603 are respectively shaped in a rectangular plate form. The supply check valve corresponding portion 601 and the recycle check valve corresponding portion 602 are formed integrally with the shaft corresponding portion 603 in one piece such that each of the supply check valve corresponding portion 601 and the recycle check valve corresponding portion 602 projects from one of two long sides of the shaft corresponding portion 603 in a transverse direction that is perpendicular to a longitudinal direction of the shaft corresponding portion 603. The check valve 60 is formed by rolling the shaft corresponding portion 603, the supply check valve corresponding portion 601 and the recycle check valve corresponding portion 602 in the transverse direction of the shaft corresponding portion 603.

The shaft 63 is shaped in a substantially cylindrical tubular form (see FIGS. 3A and 3B). The shaft 63 is formed such that the plate material, i.e., the shaft corresponding portion 603, does not have an overlapping portion, in which a part of the shaft corresponding portion 603 overlaps with another part of the shaft corresponding portion 603 in the circumferential direction.

The supply check valve 61 radially outwardly extends from the shaft 63 at a location around one end portion of the shaft 63 such that the supply check valve 61 is wound all around the shaft 63 and is thereby shaped in a substantially cylindrical tubular form (see FIGS. 3A and 3B). In this way, the supply check valve 61 is formed such that the supply check valve 61 is resiliently deformable in the radial direction. When the supply check valve 61 is radially inwardly deformed, an outer diameter of the supply check valve 61 is reduced. More specifically, the supply check valve 61 has an overlapping portion, in which a part of the plate material, i.e., the supply check valve corresponding portion 601 overlaps with another part of the supply check valve corresponding portion 601 in the circumferential direction. When a size of this overlapping portion is increased, it is radially inwardly deformed and thereby shrinks in the radial direction. In contrast, when the size of this overlapping portion is reduced, it is radially outwardly deformed and thereby expands in the radial direction. A space, which is formed at the inside of the supply check valve 61 shaped in the substantially cylindrical tubular form, is opened in the axial direction of the check valve 60.

The recycle check valve 62 radially outwardly extends from the shaft 63 such that the recycle check valve 62 is wound all around the shaft 63 and is thereby shaped in a substantially cylindrical tubular form (see FIGS. 3A and 3B). In this way, the recycle check valve 62 is formed such that the recycle check valve 62 is resiliently deformable in the radial direction. When the recycle check valve 62 is radially inwardly deformed, an outer diameter of the recycle check valve 62 is reduced. More specifically, the recycle check valve 62 has an overlapping portion, in which a part of the plate material, i.e., the recycle check valve corresponding portion 602 overlaps with another part of the recycle check valve corresponding portion 602 in the circumferential direction (see FIG. 3B). When a size of this overlapping portion is increased, it is radially inwardly deformed and thereby shrinks in the radial direction. In contrast, when the size of this overlapping portion is reduced, it is radially outwardly deformed and thereby expands in the radial direction. A space, which is formed at the inside of the recycle check valve 62 shaped in the substantially cylindrical tubular form, is opened in the axial direction of the check valve 60.

Figure 4:
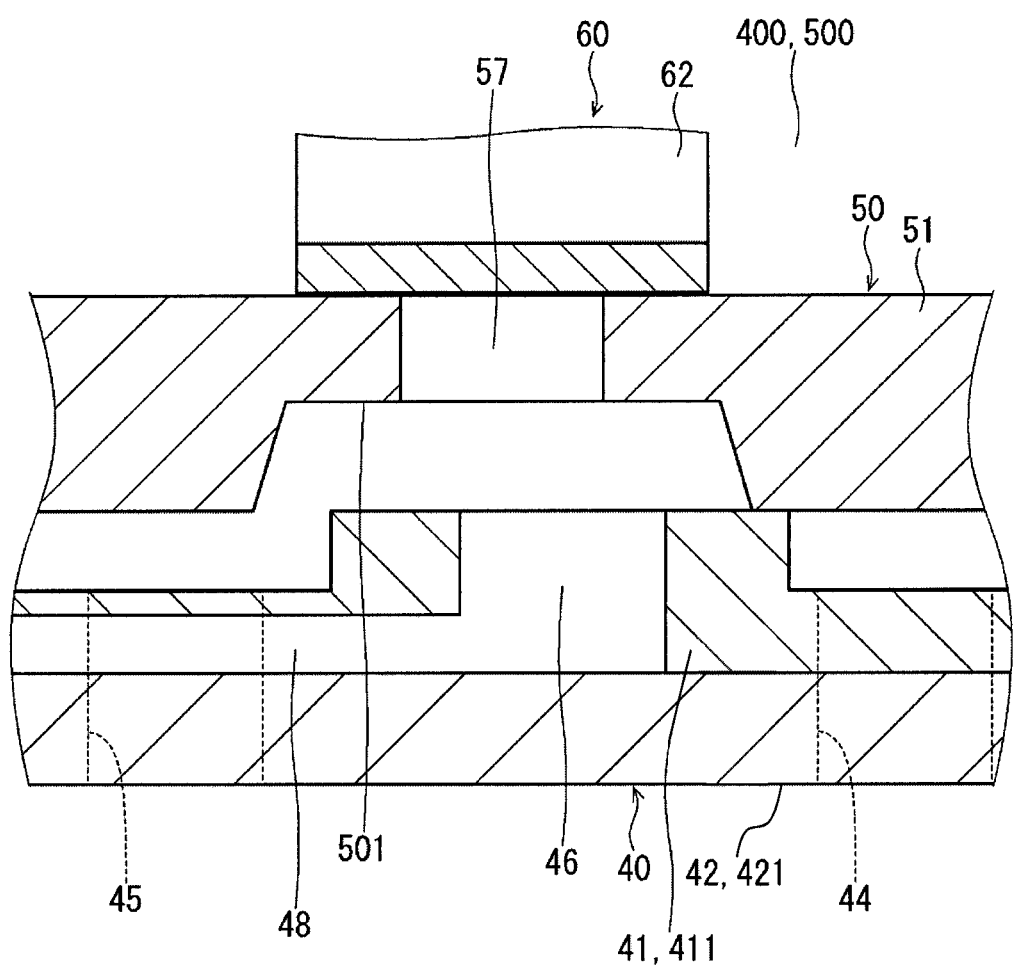
FIG. 4 is a cross-sectional view illustrating an area around a recycle passage of the valve timing adjustment device according to the first embodiment of the present disclosure.

The check valve 60 is placed in the pressure accumulation space 500 such that the supply check valve 61 corresponds to the supply passages 54, and the recycle check valve 62 corresponds to the recycle passages 57 (see FIGS. 1 and 4). The shaft 63 is positioned between the spool cover 52 and the spool bottom 53 and supports the supply check valve 61 and the recycle check valve 62.

When the hydraulic oil flows from the supply passages 54 toward the pressure accumulation space 500, an outer peripheral surface of the supply check valve 61 is radially inwardly urged by the hydraulic oil. Thus, the supply check valve 61 is radially inwardly deformed and is opened. Thereby, a gap is formed between the inner wall of the spool 50 and the supply check valve 61. As a result, the hydraulic oil can flow into the pressure accumulation space 500 through the supply passages 54. In contrast, when the hydraulic oil flows from the pressure accumulation space 500 toward the supply passages 54, an inner peripheral surface of the supply check valve 61 is radially outwardly urged by the hydraulic oil. Thus, the supply check valve 61 is radially outwardly deformed and is thereby closed. Thereby, the supply check valve 61 is urged against the inner wall of the spool 50 to close the supply passages 54. In this way, the outflow of the hydraulic oil from the pressure accumulation space 500 to the outside of the spool 50 through the supply passage 54 is limited. Thus, the supply check valve 61 enables the flow of the hydraulic oil from the supply passages 54 to the pressure accumulation space 500 and limits the flow of the hydraulic oil from the pressure accumulation space 500 to the supply passages 54.

When the hydraulic oil flows from the recycle passages 57 toward the pressure accumulation space 500, an outer peripheral surface of the recycle check valve 62 is radially inwardly urged by the hydraulic oil. Thus, the recycle check valve 62 is radially inwardly deformed and is opened. Thereby, a gap is formed between the inner wall of the spool 50 and the recycle check valve 62. In this way, the hydraulic oil can flow into the pressure accumulation space 500 through the recycle passages 57. In contrast, when the hydraulic oil flows from the pressure accumulation space 500 toward the recycle passages 57, an inner peripheral surface of the recycle check valve 62 is radially outwardly urged by the hydraulic oil. Thus, the recycle check valve 62 is radially outwardly deformed and is thereby closed. Thereby, the recycle check valve 62 is urged against the inner wall of the spool 50 to close the recycle passages 57. In this way, the outflow of the hydraulic oil from the pressure accumulation space 500 to the outside of the spool 50 through the recycle passages 57 is limited. Thus, the recycle check valve 62 enables the flow of the hydraulic oil from the recycle passages 57 to the pressure accumulation space 500 and limits the flow of the hydraulic oil from the pressure accumulation space 500 to the recycle passages 57.

As illustrated in FIG. 4, the recycle passages 57 are connected to the drain port 46 at the inside of the sleeve 40. More specifically, the recycle passages 57 are connected to the drain port 46 at an annular recess 501 formed at the outer wall of the spool tube 51.

Furthermore, the drain port 46 is formed at the sleeve 40 such that at least a portion of the drain port 46 is placed on a side of the recycle passage 57 where the radially outer side of the spool 50 is placed. More specifically, the drain port 46 is formed at the sleeve 40 such that at least the portion of the drain port 46 is placed on the side of the recycle passage 57 where the radially outer side of the spool 50 is placed when the spool 50 is positioned to contact the retaining portion 71 (see FIG. 1) or when the spool 50 is positioned to contact the sleeve bottom 412.

When the spool 50 is positioned to contact the retaining portion 71, the recess 501 communicates between the secondary control ports 45 and the recycle passages 57. Furthermore, when the spool 50 is positioned to contact the sleeve bottom 412, the recess 501 communicates between the primary control ports 44 and the recycle passages 57.

In the present embodiment, when the spool 50 is positioned to contact the retaining portion 71 (see FIG. 1), the hydraulic oil is supplied to the retard chambers 201 through the primary control ports 44, and the hydraulic oil in the advance chambers 202 flows to the recess 501 through the secondary control ports 45. A portion of the hydraulic oil, which flows into the recess 501, is returned to the pressure accumulation space 500 through the recycle passages 57 and the recycle check valve 62. Furthermore, another portion of the hydraulic oil, which flows into the recess 501, is discharged to the outside of the valve timing adjustment device 10 through the drain port 46 and the sleeve-inside passage 48.

When the spool 50 is positioned to contact the sleeve bottom 412, the hydraulic oil is supplied to the advance chambers 202 through the secondary control ports 45, and the hydraulic oil in the retard chamber 201 flows to the recess 501 through the primary control ports 44. A portion of the hydraulic oil, which flows into the recess 501, is returned to the pressure accumulation space 500 through the recycle passages 57 and the recycle check valve 62. Furthermore, another portion of the hydraulic oil, which flows into the recess 501, is discharged to the outside of the valve timing adjustment device 10 through the drain port 46 and the sleeve-inside passage 48.

The passage change valve 11 is operable among a first operating state, a second operating state and a holding state by urging the spool 50 through the operation of the linear solenoid 9. In the first operating state, the oil pump 8 is connected to the retard chambers 201, and the advance chambers 202 are connected to the recycle passages 57. In the second operating state, the oil pump 8 is connected to the advance chambers 202, and the retard chambers 201 are connected to the recycle passages 57. In the holding state, the retard chambers 201 and the advance chambers 202 are both closed. In the first operating state, the hydraulic oil is supplied to the retard chambers 201, and the hydraulic oil is returned from the advance chambers 202 to the pressure accumulation space 500. In the second operating state, the hydraulic oil is supplied to the advance chambers 202, and the hydraulic oil is returned from the retard chambers 201 to the pressure accumulation space 500. In the holding state, the hydraulic oil in the retard chambers 201 and the hydraulic oil in the advance chambers 202 are retained.

Figure 2:
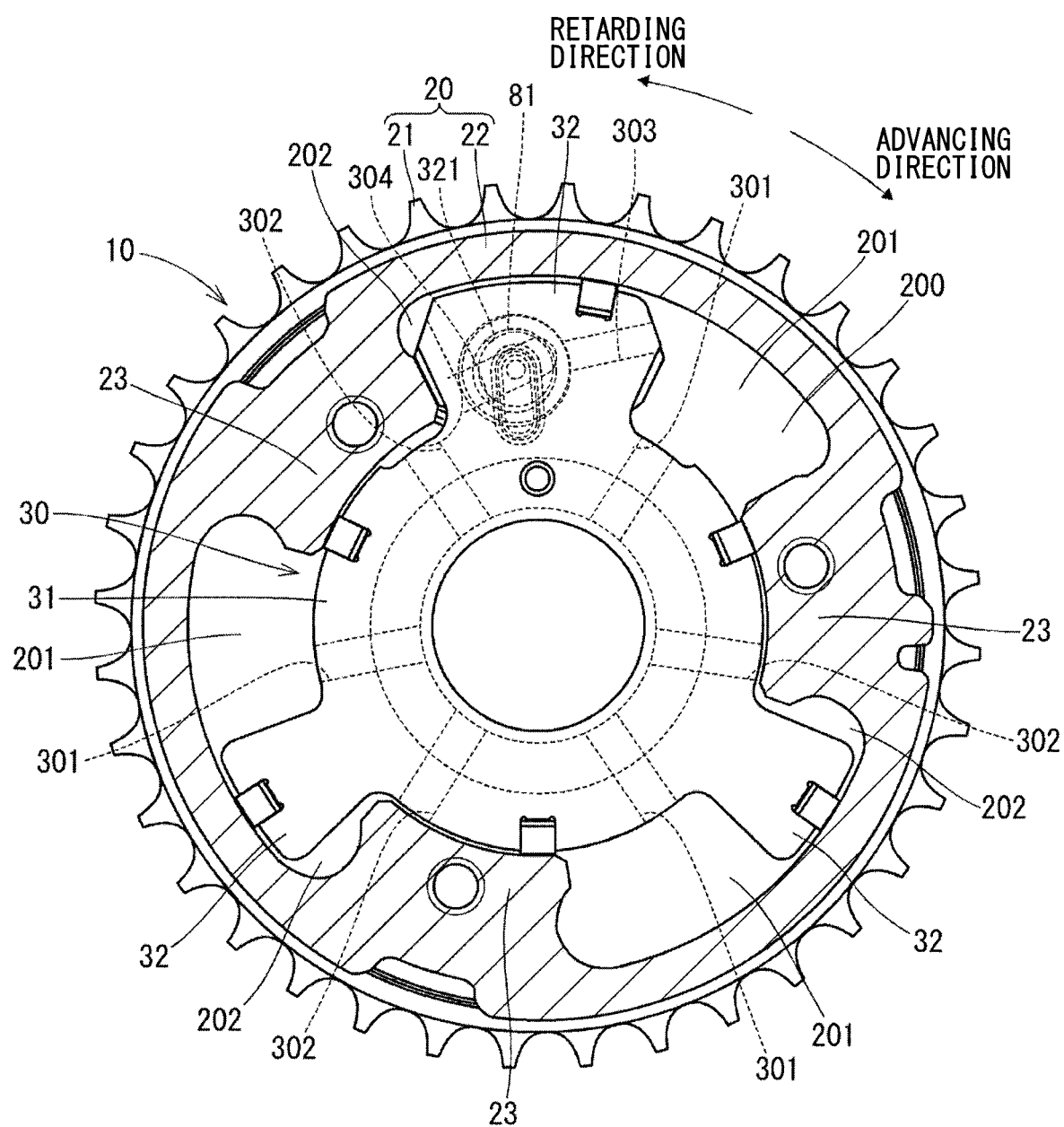
FIG. 2 is a cross-sectional view taken along line II-II of FIG. 1 and illustrating only a housing and a vane rotor.

The present embodiment is further provided with a lock pin 81 (see FIGS. 1 and 2). The lock pin 81 is shaped in a bottomed cylindrical tubular form. The lock pin 81 is received in a receiving hole 321 formed at the vane 32 in such a manner that the lock pin 81 can axially reciprocate in the receiving hole 321. A spring 82 is installed in an inside of the lock pin 81. The spring 82 urges the lock pin 81 toward the sprocket 21. A fitting recess 25 is formed at the sprocket 21 on the vane 32 side of the sprocket 21.

The lock pin 81 can be fitted into the fitting recess 25 when the vane rotor 30 is held at a most retarded position relative to the housing 20. When the lock pin 81 is fitted into the fitting recess 25, relative rotation of the vane rotor 30 relative to the housing 20 is limited. On the other hand, when the lock pin 81 is not fitted into the fitting recess 25, the relative rotation of the vane rotor 30 relative to the housing 20 is enabled.

A pin control passage 303, which is communicated with a corresponding one of the retard chambers 201, is formed in the vane 32 at a location between the lock pin 81 and the retard chamber 201. Furthermore, a pin control passage 304, which is communicated with a corresponding one of the advance chambers 202, is formed in the vane 32 at a location between the lock pin 81 and the advance chamber 202 (see FIG. 2). The pressure of the hydraulic oil, which flows from the retard chamber 201 or the advance chamber 202 into the pin control passage 303, 304, is exerted in a removing direction for removing the lock pin 81 from the fitting recess 25 against the urging force of the spring 82.

In the valve timing adjustment device 10 constructed in the above-described manner, when the hydraulic oil is supplied to the retard chambers 201 or the advance chambers 202, the hydraulic oil flows into the pin control passage 303, 304. Thereby, the lock pin 81 is removed from the fitting recess 25, and thereby the relative rotation of the vane rotor 30 relative to the housing 20 is enabled.

The valve timing adjustment device 10 brings the passage change valve 11 into the first operating state when the rotational phase of the camshaft 3 is on the advance side of a target value. As a result, the vane rotor 30 undergoes relative rotation in the retarding direction relative to the housing 20, so that the rotational phase of the camshaft 3 shifts to the retard side.

The valve timing adjustment device 10 brings the passage change valve 11 into the second operating state when the rotational phase of the camshaft 3 is on the retard side of the target value. As a result, the vane rotor 30 undergoes relative rotation in the advancing direction relative to the housing 20, so that the rotational phase of the camshaft 3 shifts to the advance side.

The valve timing adjustment device 10 brings the passage change valve 11 into the holding state when the rotational phase of the camshaft 3 coincides with the target value. In this way, the rotational phase of the camshaft 3 is maintained.

As described above, according to the present embodiment, there is provided the valve timing adjustment device 10 that is installed in the drive force transmission path for transmitting the drive force from the crankshaft 2 to the camshaft 3 of the engine 1 and adjusts the valve timing of the intake valves 4 that are driven to open and close by the camshaft 3. The valve timing adjustment device 10 of the present embodiment includes the housing 20, the vane rotor 30, the sleeve 40, the spool 50 and the recycle check valve 62.

It is now assumed that one of the crankshaft 2 and the camshaft 3 is defined as a first shaft, and the other one of the crankshaft 2 and the camshaft 3 is defined as a second shaft. In such a case, the housing 20 is rotated synchronously with the first shaft. The housing 20 is fitted to an end portion of the second shaft and is rotatably supported by the second shaft.

The vane rotor 30 is fixed to the end portion of the second shaft. The vane rotor 30 includes the vanes 32, each of which partitions the inside space 200 of the housing 20 into the retard chamber 201, which is located on one side of the vane 32 in the circumferential direction, and the advance chamber 202, which is located on the other side of the vane 32 in the circumferential direction. The vane rotor 30 is rotated relative to the housing 20 depending on the pressure of hydraulic oil supplied from the oil pump 8 to the retard chambers 201 and the pressure of the hydraulic oil supplied from the oil pump 8 to the advance chambers 202.

The sleeve 40 is shaped in the tubular form. The sleeve 40 includes: the supply ports 43, which are communicated with the oil pump 8; the primary control ports 44, which are communicated with the retard chambers 201; the secondary control ports 45, which are communicated with the advance chambers 202; and the drain port 46, which is communicated with the outside of the valve timing adjustment device 10.

The spool 50 is shaped in the tubular form and is configured to reciprocate in the axial direction at the inside of the sleeve 40. The spool 50 includes: the pressure accumulation space 500, which is formed at the inside of the spool 50; the supply passages 54, which are configured to connect between the pressure accumulation space 500 and the supply ports 43; the primary control passages 55, which are configured to connect between the pressure accumulation space 500 and the primary control ports 44; the secondary control passages 56, which are configured to connect between the pressure accumulation space 500 and the secondary control ports 45; and the recycle passages 57, which are configured to connect between the primary control ports 44 or the secondary control ports 45 and the pressure accumulation space 500. The recycle passages 57 enable reuse of the hydraulic oil discharged from the retard chambers 201 and the hydraulic oil discharged from the advance chambers 202.

The recycle check valve 62 is placed at the inside of the spool 50. The recycle check valve 62 enables the flow of the hydraulic oil from the recycle passages 57 toward the pressure accumulation space 500 and limits the flow of the hydraulic oil from the pressure accumulation space 500 toward the recycle passages 57. Thereby, it is possible to limit a backflow of the hydraulic oil from the pressure accumulation space 500 toward the recycle passages 57. As a result, in the structure that enables the reuse of the hydraulic oil, the responsiveness of the valve timing adjustment device 10 can be increased.

In the present embodiment, each of the recycle passages 57 is connected to the drain port 46 at the inside of the sleeve 40. Therefore, unlike the previously proposed technique, the sleeve 40 does not need to have the recycle port, which is different from the drain port 46 and is used to return the hydraulic oil from the respective hydraulic chambers to the pressure accumulation space. As a result, an axial size of the sleeve 40 can be made small, and thereby the passage change valve 11 can be made small.

Furthermore, in the present embodiment, the drain port 46 is formed such that at least a portion of the drain port 46 is placed on the side of the recycle passage 57 where the radially outer side of the spool 50 is placed. As a result, the axial size of the sleeve 40 and the axial size of the spool 50 can be made small.

Furthermore, in the present embodiment, the recycle passages 57 are located between the primary control passages 55 and the secondary control passages 56 in the axial direction of the sleeve 40. Therefore, the hydraulic oil discharged from the retard chambers 201 and the hydraulic oil discharged from the advance chambers 202 can be returned to the pressure accumulation space 500 through the recycle passages 57. Furthermore, the single recycle check valve 62 is sufficient.

Furthermore, in the present embodiment, the drain port 46 is communicated with the outside of the valve timing adjustment device 10 through the sleeve-inside passage 48 that is the oil passage formed in the range of the wall thickness of the sleeve 40. Therefore, a length of a path between the drain port 46 and the outside of the valve timing adjustment device 10 can be reduced.

In the present embodiment, the recycle check valve 62 is formed such that the recycle check valve 62 is resiliently deformable in the radial direction of the spool 50. Therefore, the recycle check valve 62 can be easily formed from, for example, the thin plate.

Moreover, in the present embodiment, the sleeve 40 is placed at the center of the vane rotor 30. Specifically, in the present embodiment, the sleeve 40 and the spool 50 of the passage change valve 11 are placed at the center of the vane rotor 30. In this way, a length of each oil path, which extends from the passage change valve 11 to the corresponding retard chambers 201 or advance chambers 202, can be made short, and thereby the responsiveness of the valve timing adjustment device 10 can be improved.

Second Embodiment

Figure 5:
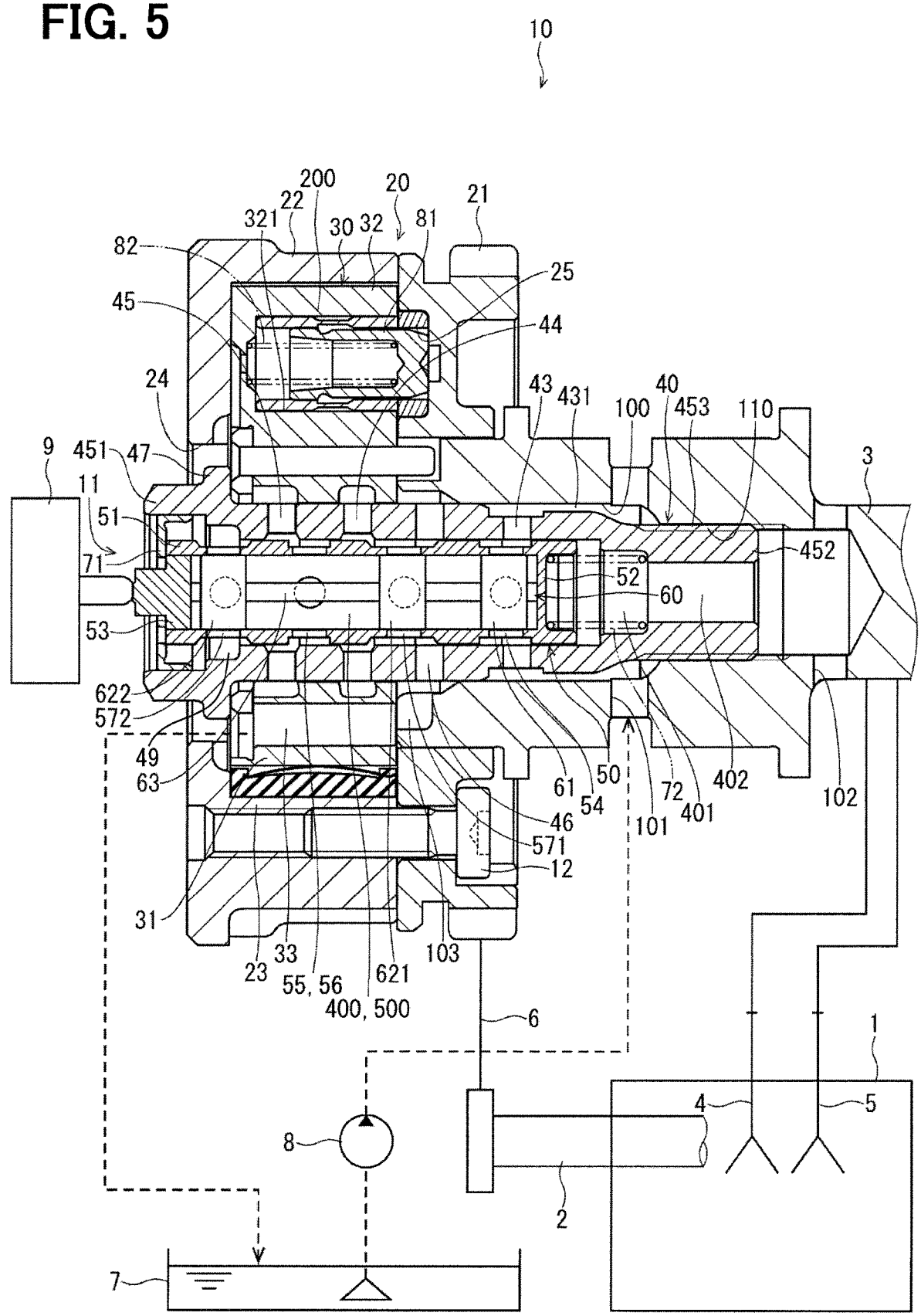
FIG. 5 is a cross-sectional view illustrating a valve timing adjustment device according to a second embodiment of the present disclosure.

FIG. 5 illustrates a valve timing adjustment device according to a second embodiment of the present disclosure. The second embodiment differs from the first embodiment with respect to the configurations of the sleeve 40, the spool 50, the check valve 60, the vane rotor 30 and the camshaft 3.

The sleeve 40 is made of metal, such as iron. The sleeve 40 has a sleeve tube 451, a sleeve bottom 452, and a threaded portion 453.

The sleeve tube 451 is shaped in a substantially cylindrical tubular form. The sleeve bottom 452 is integrally formed with the sleeve tube 451 in one piece such that the sleeve bottom 452 closes one end of the sleeve tube 451. The threaded portion 453 is formed at an outer wall of the end portion of the sleeve tube 451, which is located on the sleeve bottom 452 side.

The sleeve 40 is inserted through the inside of the boss 31 of the vane rotor 30 and is fixed to the camshaft 3 such that the threaded portion 453 of the sleeve 40 is engaged with the shaft-side threaded portion 110 of the camshaft 3.

A breathing hole 402 is formed at the sleeve bottom 452. The breathing hole 402 extends through the center of the sleeve bottom 452 in the plate thickness direction of the sleeve bottom 452. That is, the breathing hole 402 is connected to the variable volume space 401.

External communication holes 102 are formed at the camshaft 3. The external communication holes 102 are formed such that the external communication holes 102 communicate between the shaft hole 100 and the outside of the camshaft 3. Thus, the variable volume space 401 is communicated with the outside of the camshaft 3 through the breathing hole 402, the shaft hole 100 and the external communication holes 102, that is, the variable volume space 401 is communicated with the atmosphere through the breathing hole 402, the shaft hole 100 and the external communication holes 102. As a result, the pressure in the variable volume space 401 can be made equal to the atmospheric pressure. In the present embodiment, the pressure of the variable volume space 401 is kept substantially equal to the atmospheric pressure through the breathing hole 402 and the external communication holes 102. Therefore, when the spool 50 is urged by the linear solenoid 9, the spool 50 can smoothly reciprocated at the inside of the sleeve 40.

The spool cover 52 is formed integrally with the spool tube 51 in one piece. The spool bottom 53 is formed separately from the spool tube 51 and is press fitted into an opposite end of the spool tube 51, which is opposite from the spool cover 52.

In the present embodiment, the spool 50 has a plurality of recycle passages 571 and a plurality of recycle passages 572 in place of the recycle passages 57.

On the side of the supply passages 54, which is opposite from the spool cover 52, each of the recycle passages 571 is formed such that the recycle passage 571 connects between the inner wall of the spool tube 51 and an annular recess, which is formed at the outer wall of the spool tube 51. The recycle passages 571 are arranged one after the other in the circumferential direction of the spool 50.

On the side of the recycle passages 571, which is opposite from the spool cover 52, each of the recycle passages 572 is formed such that the recycle passage 572 connects between the inner wall of the spool tube 51 and an annular recess, which is formed at the outer wall of the spool tube 51. The recycle passages 572 are arranged one after the other in the circumferential direction of the spool 50.

In the present embodiment, a corresponding one of the primary control passages 55 and a corresponding one of the secondary control passages 56 are formed integrally at a location between the recycle passages 571 and the recycle passages 572.

In the present embodiment, a plurality of drain ports 46 is formed at a location between the supply ports 43 and the primary control ports 44. Each drain port 46 is formed at the sleeve 40 such that at least a portion of the drain port 46 is placed on a side of the corresponding recycle passage 571 where the radially outer side of the spool 50 is placed. More specifically, the drain port 46 is formed at the sleeve 40 such that at least the portion of the drain port 46 is placed on the side of the recycle passage 571 where the radially outer side of the spool 50 is placed when the spool 50 is positioned to contact the retaining portion 71 (see FIG. 5) or when the spool 50 is positioned to contact the sleeve bottom 452. The recycle passages 571 are connected to the drain ports 46 at the inside of the sleeve 40.

A sleeve-outside passage 103 is formed at the camshaft 3 at a location that is on the radially outer side of the drain ports 46 in the radial direction of the sleeve 40. Furthermore, a sleeve-outside passage 33 is formed at the boss 31 of the vane rotor 30 such that the sleeve-outside passage 33 extends through the boss 31 in a plate thickness direction of the boss 31. The drain ports 46 are communicated with the sleeve-outside passage 103 and the sleeve-outside passage 33. Therefore, the drain ports 46 are communicated with the opposite side of the boss 31, which is opposite to the camshaft 3, through the sleeve-outside passage 103 and the sleeve-outside passage 33, that is, the drain ports 46 are communicated to the outside of the valve timing adjustment device 10 through the sleeve-outside passage 103 and the sleeve-outside passage 33.

The sleeve 40 also has a drain port 49. The drain port 49 is formed at the sleeve 40 such that at least a portion of the drain port 49 is placed on the side of the recycle passages 572 where the radially outer side of the spool 50 is placed. More specifically, the drain port 49 is formed at the sleeve 40 such that at least the portion of the drain port 49 is placed on the side of the recycle passages 572 where the radially outer side of the spool 50 is placed when the spool 50 is positioned to contact the retaining portion 71 or when the spool 50 is positioned to contact the sleeve bottom 452. The recycle passages 571 are connected to the drain port 49 at the inside of the sleeve 40.

The drain port 49 is communicated with the opposite side of the passage change valve 11, which is opposite from the camshaft 3, i.e., the drain port 49 is communicated with the outside of the valve timing adjustment device 10.

In the present embodiment, the check valve 60 has recycle check valves 621, 622 in place of the recycle check valve 62.

Since the configuration of the respective recycle check valves 621, 622 is similar to the configuration of the recycle check valve 62, description of the recycle check valves 621, 622 will be omitted for the sake of simplicity.

The check valve 60 is placed at the pressure accumulation space 500 such that the supply check valve 61 corresponds to the supply passages 54, and the recycle check valve 621 corresponds to the recycle passages 571, and the recycle check valve 622 corresponds to the recycle passages 572.

When the hydraulic oil flows from the recycle passages 571, 572 toward the pressure accumulation space 500, the recycle check valves 621, 622 are radially inwardly deformed. Thereby, a gap is formed between the inner wall of the spool 50 and the recycle check valve 621, 622. As a result, the hydraulic oil can flow into the pressure accumulation space 500 through the recycle passages 571, 572. In contrast, when the hydraulic oil flows from the pressure accumulation space 500 toward the recycle passages 571, 572, the recycle check valves 621, 622 are radially outwardly deformed. Thereby, the recycle check valves 621, 622 are urged against the inner wall of the spool 50 to close the recycle passages 571, 572. In this way, the outflow of the hydraulic oil from the pressure accumulation space 500 to the outside of the spool 50 through the recycle passages 571, 572 is limited. Thus, the recycle check valve 62 enables the flow of the hydraulic oil from the recycle passages 571, 572 to the pressure accumulation space 500 and limits the flow of the hydraulic oil from the pressure accumulation space 500 to the recycle passages 571, 572.

In the present embodiment, when the spool 50 is positioned to contact the retaining portion 71 (see FIG. 5), the hydraulic oil is supplied to the advance chambers 202 through the primary control passages 55, the secondary control passages 56 and the secondary control ports 45, and the hydraulic oil in the retard chambers 201 flows to the recess, which is located on the radially outer side of the recycle passages 571, through the primary control ports 44. A portion of the hydraulic oil, which flows into this recess, is returned to the pressure accumulation space 500 through the recycle passages 571 and the recycle check valve 621. Furthermore, another portion of the hydraulic oil, which flows into this recess, is discharged to the outside of the valve timing adjustment device 10 through the drain ports 46, the sleeve-outside passage 103 and the sleeve-outside passage 33.

When the spool 50 is positioned to contact the sleeve bottom 452, the hydraulic oil is supplied to the retard chambers 201 through the primary control passages 55, the secondary control passages 56 and the primary control ports 44, and the hydraulic oil in the advance chambers 202 flows into the recess, which is located on the radially outer side of the recycle passages 572, through the secondary control ports 45. A portion of the hydraulic oil, which flows into this recess, is returned to the pressure accumulation space 500 through the recycle passages 572 and the recycle check valve 622. Furthermore, another portion of the hydraulic oil, which flows into this recess, is discharged to the outside of the valve timing adjustment device 10 through the drain port 49.

Other than the points described above, the structure of the second embodiment is the same as that of the first embodiment. Therefore, the structure, which is the same as the structure of the first embodiment, can achieve the same advantages as those of the first embodiment.

As discussed above, in the present embodiment, the recycle passages 571 are connected to the drain ports 46 at the inside of the sleeve 40. Furthermore, the recycle passages 572 are connected to the drain port 49 at the inside of the sleeve 40. Therefore, unlike the previously proposed technique, the sleeve 40 does not need to have the recycle port, which is different from the drain ports 46, 49 and is used to return the hydraulic oil from the respective hydraulic chambers to the pressure accumulation space. As a result, an axial size of the sleeve 40 can be made small, and thereby the passage change valve 11 can be made small.

Furthermore, in the present embodiment, each of the drain ports 46, 49 is formed such that at least a portion of the drain port 46, 49 is placed on the side of the recycle passage 571, 572 where the radially outer side of the spool 50 is placed. As a result, the axial size of the sleeve 40 and the axial size of the spool 50 can be made small.

Furthermore, in the present embodiment, the drain port 49 is communicated to the outside of the valve timing adjustment device 10 through the location between the sleeve 40 and the spool 50. Therefore, it is not required to form another passage at another member, which is other than the sleeve 40, in order to communicate the drain port 49 to the outside of the valve timing adjustment device 10. In this way, the structure can be simplified.

Furthermore, in the present embodiment, the two types of recycle passages (571, 572) are arranged one after the other in the axial direction of the sleeve 40. Each of the primary control passages 55 and the corresponding one of the secondary control passages 56 are formed integrally at the location between these two types of recycle passages (571, 572). Therefore, even though the two types of the recycle passages (571, 572) are formed, the axial size of the spool 50 can be made small. Furthermore, the length of the path from the pressure accumulation space 500 to the primary control ports 44 or the secondary control ports 45 can be reduced.

Moreover, the drain ports 46 are communicated to the outside of the valve timing adjustment device 10 through the sleeve-outside passage 103, which is formed at the camshaft 3, and the sleeve-outside passage 33, which is formed at the vane rotor 30. Therefore, it is not required to form a passage, which communicates the drain ports 46 to the outside of the valve timing adjustment device 10, at the inside of the sleeve 40. Thus, the size of the sleeve 40 and the size of the passage change valve 11 can be made small.

Third Embodiment

Figure 6:
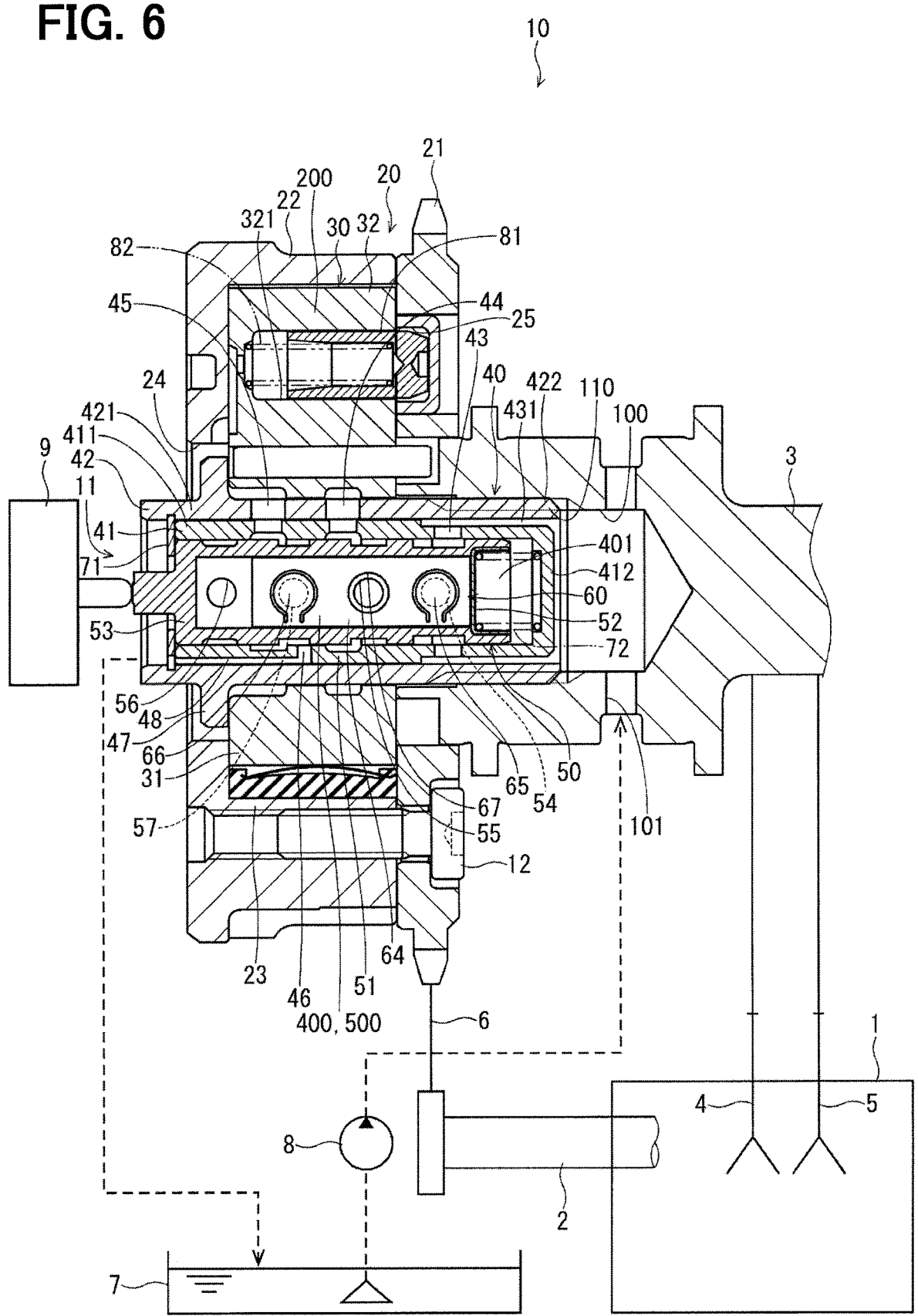
FIG. 6 is a cross-sectional view illustrating a valve timing adjustment device according to a third embodiment of the present disclosure.

FIG. 6 illustrates a valve timing adjustment device according to a third embodiment of the present disclosure. The third embodiment differs from the first embodiment with respect to the configuration of the check valve 60.

Figure 7A:
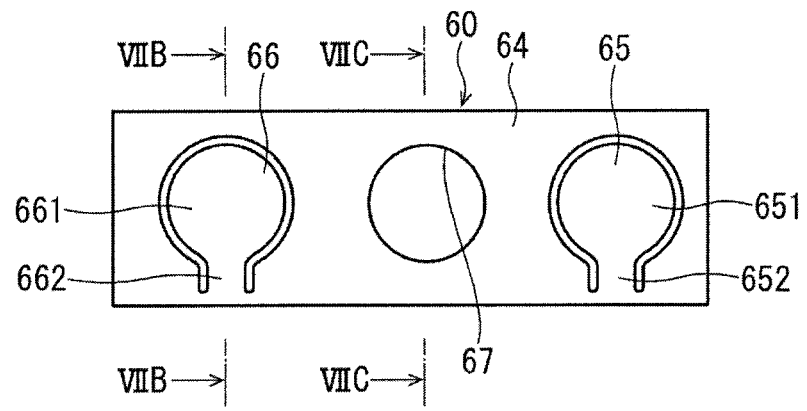
FIG. 7A is a diagram illustrating a check valve of the valve timing adjustment device according to the third embodiment of the present disclosure.
Figure 7B:
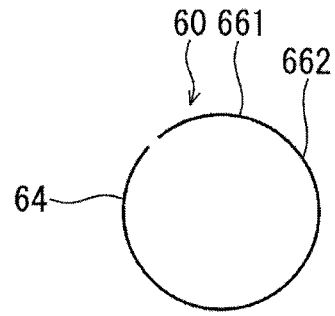
FIG. 7B is a cross-sectional view taken along line VIIB-VIIB in FIG. 7A.
Figure 7C:
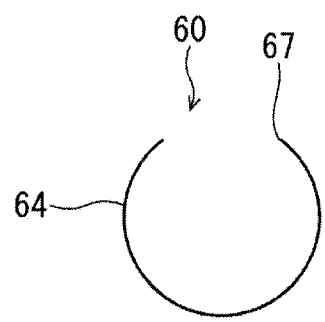
FIG. 7C is a cross-sectional view taken along line VIIC-VIIC in FIG. 7A.

As illustrated in FIGS. 7A to 7C, the check valve 60 has a main body 64, a supply check valve 65, a recycle check valve 66 and a hole 67.

The main body 64 is shaped in a substantially cylindrical tubular form and is made of, for example, metal. A wall thickness of the main body 64 is set to be relatively small.

The supply check valve 65 is formed by forming a hole that connects between an outer wall and an inner wall of the main body 64. The supply check valve 65 has a valve portion 651 and a support portion 652. The valve portion 651 is shaped in a substantially circular form. The support portion 652 connects between the main body 64 and the valve portion 651 and supports the valve portion 651. The supply check valve 65 is formed such that the supply check valve 65 is resiliently deformable in the radial direction.

The recycle check valve 66 is formed by forming a hole that connects between an outer wall and an inner wall of the main body 64. The recycle check valve 66 has a valve portion 661 and a support portion 662. The valve portion 661 is shaped in a substantially circular form. The support portion 662 connects between the main body 64 and the valve portion 661 and supports the valve portion 661. The recycle check valve 66 is formed such that the recycle check valve 66 is resiliently deformable in the radial direction.

The supply check valve 65 and the recycle check valve 66 are so-called reed valves.

The hole 67 is shaped in a substantially circular form and connects between the outer wall and the inner wall of the main body 64 at a location that is between the supply check valve 65 and the recycle check valve 66.

The check valve 60 is placed in the pressure accumulation space 500 such that the supply check valve 65 corresponds to the supply passage 54, and the recycle check valve 66 corresponds to the recycle passage 57, and the hole 67 corresponds to the primary control passage 55 (see FIG. 6). The check valve 60 is placed on the spool cover 52 side of the secondary control passage 56.

When the hydraulic oil flows from the supply passage 54 toward the pressure accumulation space 500, an outer peripheral surface of the valve portion 651 of the supply check valve 65 is radially inwardly urged by the hydraulic oil. Thus, the valve portion 651 of the supply check valve 65 is radially inwardly deformed and is opened. Thereby, a gap is formed between the inner wall of the spool 50 and the valve portion 651 of the supply check valve 65. As a result, the hydraulic oil can flow into the pressure accumulation space 500 through the supply passage 54. In contrast, when the hydraulic oil flows from the pressure accumulation space 500 toward the supply passage 54, an inner peripheral surface of the valve portion 651 of the supply check valve 65 is radially outwardly urged by the hydraulic oil. Thus, the valve portion 651 of the supply check valve 65 is radially outwardly deformed and is thereby closed. Thereby, the valve portion 651 of the supply check valve 61 is urged against the inner wall of the spool 50 to close the supply passage 54. In this way, the outflow of the hydraulic oil from the pressure accumulation space 500 to the outside of the spool 50 through the supply passage 54 is limited. Thus, the supply check valve 65 enables the flow of the hydraulic oil from the supply passage 54 to the pressure accumulation space 500 and limits the flow of the hydraulic oil from the pressure accumulation space 500 to the supply passage 54.

When the hydraulic oil flows from the recycle passage 57 toward the pressure accumulation space 500, an outer peripheral surface of the valve portion 661 of the recycle check valve 66 is radially inwardly urged by the hydraulic oil. Thus, the valve portion 661 of the recycle check valve 66 is radially inwardly deformed and is opened. Thereby, a gap is formed between the inner wall of the spool 50 and the valve portion 661 of the recycle check valve 66. In this way, the hydraulic oil can flow into the pressure accumulation space 500 through the recycle passage 57. In contrast, when the hydraulic oil flows from the pressure accumulation space 500 toward the recycle passage 57, an inner peripheral surface of the valve portion 661 of the recycle check valve 66 is radially outwardly urged by the hydraulic oil. Thus, the valve portion 661 of the recycle check valve 66 is radially outwardly deformed and is thereby closed. Thereby, the valve portion 661 of the recycle check valve 66 is urged against the inner wall of the spool 50 to close the recycle passage 57. In this way, the outflow of the hydraulic oil from the pressure accumulation space 500 to the outside of the spool 50 through the recycle passage 57 is limited. Thus, the recycle check valve 66 enables the flow of the hydraulic oil from the recycle passage 57 to the pressure accumulation space 500 and limits the flow of the hydraulic oil from the pressure accumulation space 500 to the recycle passage 57.

Other than the points described above, the structure of the third embodiment is similar to the structure of the first embodiment. Therefore, the structure, which is the same as the structure of the first embodiment, can achieve the same advantages as those of the first embodiment.

Fourth Embodiment

Figure 8:
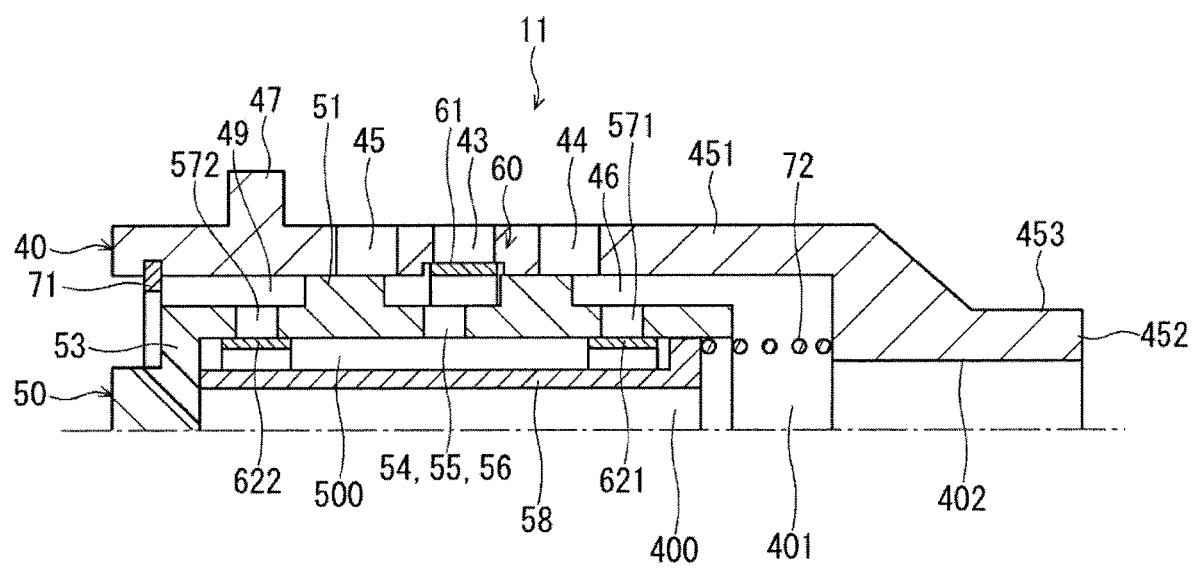
FIG. 8 is a cross-sectional view illustrating a passage change valve of a valve timing adjustment device according to a fourth embodiment of the present disclosure.

FIG. 8 illustrates a portion of a valve timing adjustment device according to a fourth embodiment of the present disclosure. The fourth embodiment differs from the second embodiment with respect to the configurations of the sleeve 40, the spool 50 and the check valve 60.

In the present embodiment, the supply ports 43 are formed at a location between the primary control ports 44 and the secondary control ports 45.

The spool 50 has a seal member 58 in place of the spool cover 52. The seal member 58 is shaped in a substantially cylindrical tubular form and is placed at the inside of the spool tube 51. The pressure accumulation space 500, which is shaped in a substantially cylindrical tubular form, is placed between an outer wall of the seal member 58 and an inner wall of the spool tube 51.

In the present embodiment, a corresponding one of the primary control passages 55, a corresponding one of the secondary control passages 56 and a corresponding one of the supply passages 54 are formed integrally at a location between the recycle passages 571 and the recycle passages 572.

In the present embodiment, the sleeve 40 forms the drain port 46. At a location between the sleeve tube 451 and the spool tube 51, the drain port 46 is placed on a side of the recycle passages 571 where the radially outer side of the spool 50 is placed. The drain port 46 is communicated with the outside of the valve timing adjustment device 10, which is the outside of the camshaft 3, through the variable volume space 401 and the breathing hole 402, that is, the drain port 46 is communicated with the atmosphere through the variable volume space 401 and the breathing hole 402. The recycle passages 571 are connected to the drain port 46 at the inside of the sleeve 40.

The sleeve 40 forms the drain port 49. At a location between the sleeve tube 451 and the spool tube 51, the drain port 49 is placed on a side of the recycle passages 572 where the radially outer side of the spool 50 is placed. The drain port 49 is communicated with the opposite side of the passage change valve 11, which is opposite from the camshaft 3, i.e., the drain port 49 is communicated with the outside of the valve timing adjustment device 10. The recycle passages 572 are connected to the drain port 49 at the inside of the sleeve 40.

The check valve 60 includes the supply check valve 61 and recycle check valves 621, 622.

The supply check valve 61 and the recycle check valves 621, 622 are formed separately from one another. Since the configurations of the supply check valve 61 and the recycle check valves 621, 622 are similar to those of the second embodiment and are thereby not described for the sake of simplicity.

The supply check valve 61 is placed at a position that is between the sleeve 40 and the spool 50 and corresponds to the supply ports 43. The recycle check valve 621 is placed at a position that is between the spool tube 51 and the seal member 58 and corresponds to the recycle passages 571. The recycle check valve 622 is placed at a position that is between the spool tube 51 and the seal member 58 and corresponds to the recycle passages 572.

When the hydraulic oil flows from the supply ports 43 toward the pressure accumulation space 500, the supply check valve 61 is radially inwardly deformed. Thereby, a gap is formed between the inner wall of the sleeve 40 and the supply check valve 61. As a result, the hydraulic oil can flow into the pressure accumulation space 500 through the supply ports 43 and the supply passages 54. In contrast, when the hydraulic oil flows from the pressure accumulation space 500 toward the supply ports 43, the supply check valve 61 is radially outwardly deformed. Thus, the supply check valve 61 is urged against the inner wall of the sleeve 40 to close the supply ports 43. In this way, the outflow of the hydraulic oil from the pressure accumulation space 500 to the outside of the sleeve 40 through the supply passages 54 and the supply ports 43 is limited. Thus, the supply check valve 61 enables the flow of the hydraulic oil from the supply ports 43 to the pressure accumulation space 500 and limits the flow of the hydraulic oil from the pressure accumulation space 500 to the supply ports 43.

When the hydraulic oil flows from the recycle passages 571, 572 toward the pressure accumulation space 500, the recycle check valves 621, 622 are radially inwardly deformed. Thereby, a gap is formed between the inner wall of the spool 50 and the recycle check valve 621, 622. As a result, the hydraulic oil can flow into the pressure accumulation space 500 through the recycle passages 571, 572. In contrast, when the hydraulic oil flows from the pressure accumulation space 500 toward the recycle passages 571, 572, the recycle check valves 621, 622 are radially outwardly deformed. Thereby, the recycle check valves 621, 622 are urged against the inner wall of the spool 50 to close the recycle passages 571, 572. In this way, the outflow of the hydraulic oil from the pressure accumulation space 500 to the outside of the spool 50 through the recycle passages 571, 572 is limited. Thus, the recycle check valve 62 enables the flow of the hydraulic oil from the recycle passages 571, 572 to the pressure accumulation space 500 and limits the flow of the hydraulic oil from the pressure accumulation space 500 to the recycle passages 571, 572.

In the present embodiment, when the spool 50 is positioned to contact the retaining portion 71, the hydraulic oil is supplied to the advance chambers 202 through the secondary control ports 45, and the hydraulic oil in the retard chambers 201 flows to the drain port 46 through the primary control ports 44. A portion of the hydraulic oil, which flows into the drain port 46, is returned to the pressure accumulation space 500 through the recycle passages 571 and the recycle check valve 621. A portion of the hydraulic oil, which flows into the drain port 46, is discharged to the outside of the valve timing adjustment device 10, which is the outside of the camshaft 3, through the variable volume space 401 and the breathing hole 402, that is the portion of the hydraulic oil, which flows into the drain port 46, is discharged to the atmosphere through the variable volume space 401 and the breathing hole 402.

When the spool 50 is positioned to contact the sleeve bottom 452, the hydraulic oil is supplied to the retard chambers 201 through the primary control ports 44, and the hydraulic oil in the advance chambers 202 flows to the drain port 49 through the secondary control ports 45. A portion of the hydraulic oil, which flows into the drain port 49, is returned to the pressure accumulation space 500 through the recycle passages 572 and the recycle check valve 622. Furthermore, another portion of the hydraulic oil, which flows into the drain port 49, is discharged to the outside of the outside of the valve timing adjustment device 10.

Other than the points described above, the structure of the fourth embodiment is similar to the structure of the second embodiment. Therefore, the structure, which is the same as the structure of the second embodiment, can achieve the same advantages as those of the second embodiment.

Fifth Embodiment

Figure 9:
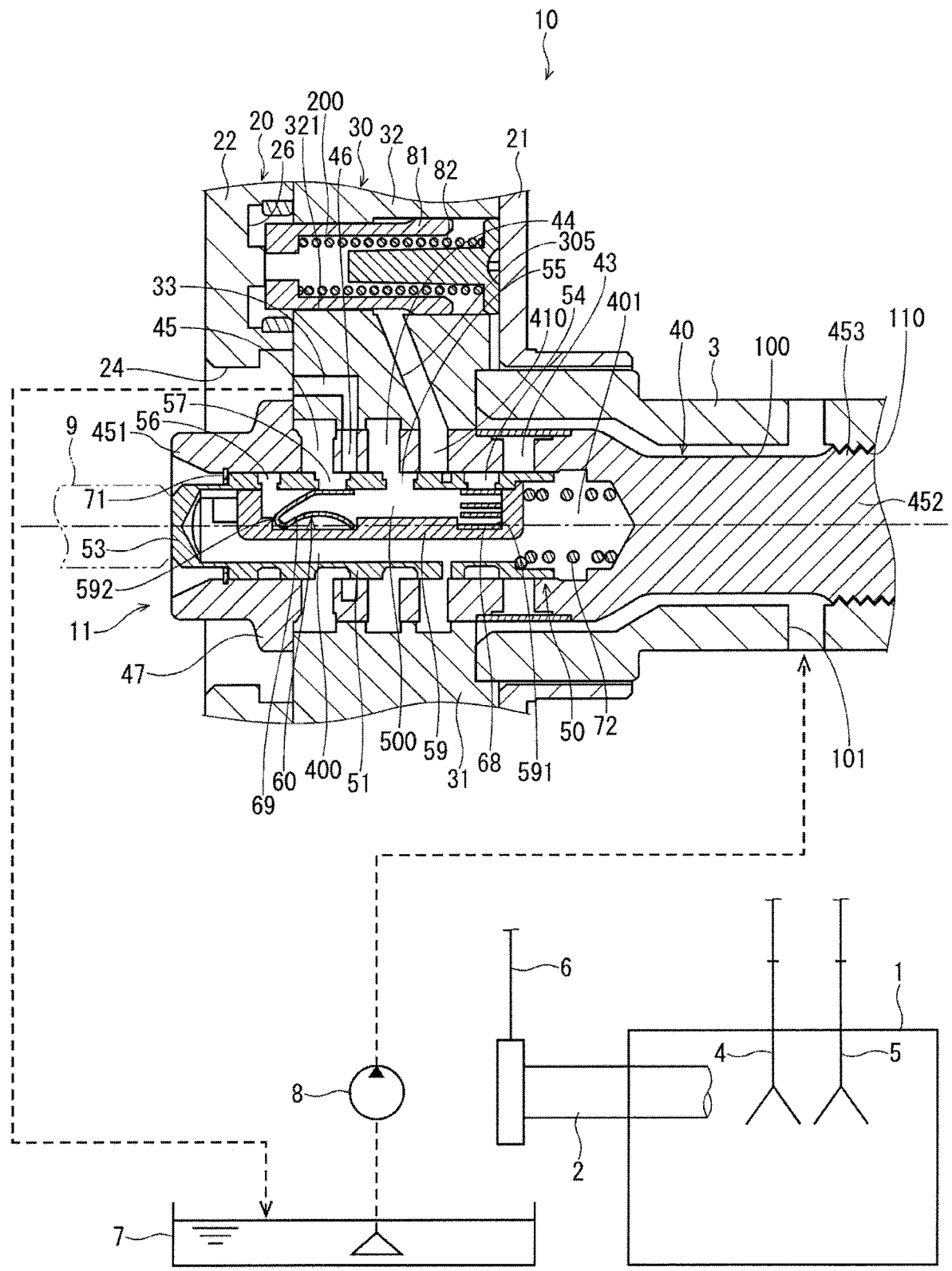
FIG. 9 is a cross-sectional view illustrating a part of a valve timing adjustment device according to a fifth embodiment of the present disclosure.

FIG. 9 illustrates a valve timing adjustment device according to a fifth embodiment of the present disclosure. The fifth embodiment differs from the first embodiment with respect to the configurations of the sleeve 40, the spool 50 and the check valve 60.

Similar to the second embodiment, the sleeve 40 has the sleeve tube 451, the sleeve bottom 452 and the threaded portion 453.

Each of the supply ports 43 is formed such that the supply port 43 connects between the outer wall and the inner wall of the sleeve tube 451. The supply ports 43 are communicated with the supply holes 101 through a gap that is shaped in a tubular form and is formed between the outer wall of the spool 50 and the inner wall of the shaft hole 100.

Each of the primary control ports 44 is formed such that the primary control port 44 connects between the outer wall and the inner wall of the sleeve tube 451 on the retaining portion 47 side of the supply ports 43.

Each of the secondary control ports 45 is formed such that the secondary control port 45 connects between the outer wall and the inner wall of the sleeve tube 451 on the retaining portion 47 side of the primary control ports 44.

The drain port 46 is formed such that the drain port 46 connects between the outer wall and the inner wall of the sleeve tube 451 at a location between the primary control ports 44 and the secondary control ports 45.

In the present embodiment, each of pin control ports 410 is formed to connect between the outer wall and the inner wall of the sleeve tube 451 at a location that is between the supply ports 43 and the primary control ports 44. Furthermore, a pin control passage 305, which connects between the pin control ports 410 and the receiving hole 321, is formed at the vane rotor 30. A fitting recess 26, into which the lock pin 81 can be fitted, is formed at the case 22 on the side where the vane 32 is placed. The spring 82 urges the lock pin 81 toward the case 22. The pressure of the hydraulic oil, which flows into the pin control ports 410 and the pin control passage 305, is exerted in a removing direction for removing the lock pin 81 from the fitting recess 26 against the urging force of the spring 82. When the lock pin 81 is fitted into the fitting recess 26, relative rotation of the vane rotor 30 relative to the housing 20 is limited. In contrast, when the lock pin 81 is not fitted into the fitting recess 26, the relative rotation of the vane rotor 30 relative to the housing 20 is enabled.

A sleeve-outside passage 33 is formed at the boss 31 of the vane rotor 30. The sleeve-outside passage 33 is formed such that the sleeve-outside passage 33 communicates between the drain port 49 and the outside of the valve timing adjustment device 10.

The spool 50 has a seal member 59 in place of the spool cover 52. The seal member 59 is placed at the inside of the spool tube 51. The pressure accumulation space 500, which extends in the axial direction of the spool 50, is formed between an inner wall of the seal member 59 and the inner wall of the spool tube 51.

The supply passage 54, the primary control passage 55, the recycle passage 57 and the secondary control passage 56 are arranged in this order at predetermined intervals from one end side to the other end side of the spool 50. The supply passage 54, the primary control passage 55, the recycle passage 57 and the secondary control passage 56 communicate the pressure accumulation space 500 to the outside of the spool 50.

In the present embodiment, when the spool 50 is positioned to contact the retaining portion 71 (see FIG. 9), the supply ports 43 are not connected to the supply passage 54. When the spool 50 moves toward the camshaft 3 by a predetermined amount, the supply ports 43 are connected to the supply passage 54, and the primary control passage 55 is connected to the primary control ports 44, and the secondary control ports 45 are connected to the recycle passage 57. At this time, the primary control passage 55 is connected to the pin control ports 410.

When the spool 50 is positioned to contact the sleeve bottom 412, the supply ports 43 are connected to the supply passage 54, and the secondary control passage 56 is connected to the secondary control ports 45, and the primary control ports 44 are connected to the recycle passage 57. At this time, the primary control passage 55 is connected to the pin control ports 410.

The drain port 46 is formed at the sleeve 40 such that at least a portion of the drain port 46 is placed on the side of the recycle passage 57 where the radially outer side of the spool 50 is placed. More specifically, the drain port 46 is formed at the sleeve 40 such that at least the portion of the drain port 46 is placed on the side of the recycle passage 57 where the radially outer side of the spool 50 is placed when the spool 50 is positioned to contact the retaining portion 71 (see FIG. 9) or when the spool 50 is positioned to contact the sleeve bottom 452.

The check valve 60 includes a supply check valve 68 and a recycle check valve 69.

The supply check valve 68 and the recycle check valve 69 are formed separately from each other. The supply check valve 68 and the recycle check valve 69 are respectively formed by folding a thin metal plate.

The supply check valve 68 is placed in the pressure accumulation space 500 at a location that corresponds to the supply passage 54. The supply check valve 68 is supported by a supply-side support portion 591 that is formed at an inner wall of the seal member 59. The supply check valve 68 is resiliently deformable in the radial direction of the spool 50.

The recycle check valve 69 is placed in the pressure accumulation space 500 at a location that corresponds to the recycle passage 57. The recycle check valve 69 is supported by a recycle-side support portion 592 that is formed at the inner wall of the seal member 59. The recycle check valve 69 is resiliently deformable in the radial direction of the spool 50.

When the hydraulic oil flows from the supply passage 54 toward the pressure accumulation space 500, the supply check valve 68 is radially inwardly deformed in the radial direction of the spool 50. Thereby, a gap is formed between the inner wall of the spool 50 and the supply check valve 68. As a result, the hydraulic oil can flow into the pressure accumulation space 500 through the supply passage 54. In contrast, when the hydraulic oil flows from the pressure accumulation space 500 toward the supply passage 54, the supply check valve 68 is radially outwardly deformed in the radial direction of the spool 50. Thereby, the supply check valve 68 is urged against the inner wall of the spool 50 to close the supply passage 54. In this way, the outflow of the hydraulic oil from the pressure accumulation space 500 to the outside of the spool 50 through the supply passage 54 is limited. Thus, the supply check valve 68 enables the flow of the hydraulic oil from the supply passage 54 to the pressure accumulation space 500 and limits the flow of the hydraulic oil from the pressure accumulation space 500 to the supply passage 54.

When the hydraulic oil flows from the recycle passage 57 toward the pressure accumulation space 500, the recycle check valve 69 is radially inwardly deformed. Thereby, a gap is formed between the inner wall of the spool 50 and the recycle check valve 69. In this way, the hydraulic oil can flow into the pressure accumulation space 500 through the recycle passage 57. In contrast, when the hydraulic oil flows from the pressure accumulation space 500 toward the recycle passage 57, the recycle check valve is radially outwardly deformed. Thereby, the recycle check valve 69 is urged against the inner wall of the spool 50 to close the recycle passage 57. In this way, the outflow of the hydraulic oil from the pressure accumulation space 500 to the outside of the spool 50 through the recycle passage 57 is limited. Thus, the recycle check valve 69 enables the flow of the hydraulic oil from the recycle passage 57 to the pressure accumulation space 500 and limits the flow of the hydraulic oil from the pressure accumulation space 500 to the recycle passage 57.

In the present embodiment, when the spool 50 is moved from the position (see FIG. 9), at which the spool 50 contacts the retaining portion 71, toward the camshaft 3 by the predetermined amount, the hydraulic oil flows into the pressure accumulation space 500 through the supply ports 43, the supply passage 54 and the supply check valve 68, and the hydraulic oil flows into the pin control ports 410 and the pin control passage 305 through the primary control passage 55. Thereby, the relative rotation of the vane rotor 30 relative to the housing 20 is enabled. At this time, the hydraulic oil in the pressure accumulation space 500 is supplied to the retard chambers 201 through the primary control passage 55 and the primary control ports 44, and the hydraulic oil in the advance chambers 202 flows to the recess, which is located on the radially outer side of the recycle passage 57, through the secondary control ports 45. A portion of the hydraulic oil, which flows into this recess, is returned to the pressure accumulation space 500 through the recycle passage 57 and the recycle check valve 69. Furthermore, another portion of the hydraulic oil, which flows into this recess, is discharged to the outside of the valve timing adjustment device 10 through the drain port 49 and the sleeve-outside passage 33.

When the spool 50 is positioned to contact the sleeve bottom 452, the hydraulic oil flows into the pin control ports 410 and the pin control passage 305 through the primary control passage 55. Thereby, the relative rotation of the vane rotor 30 relative to the housing 20 is enabled. At this time, the hydraulic oil is supplied to the advance chambers 202 through the secondary control passage 56 and the secondary control ports 45, and the hydraulic oil in the retard chambers 201 flows to the recess, which is located on the radially outer side of the recycle passage 57, through the primary control ports 44. A portion of the hydraulic oil, which flows into this recess, is returned to the pressure accumulation space 500 through the recycle passage 57 and the recycle check valve 69. Furthermore, another portion of the hydraulic oil, which flows into this recess, is discharged to the outside of the valve timing adjustment device 10 through the drain port 49 and the sleeve-outside passage 33.

Other than the points described above, the structure of the fifth embodiment is similar to the structure of the first embodiment. Therefore, the structure, which is the same as the structure of the first embodiment, can achieve the same advantages as those of the first embodiment.

Sixth Embodiment

Figure 10:
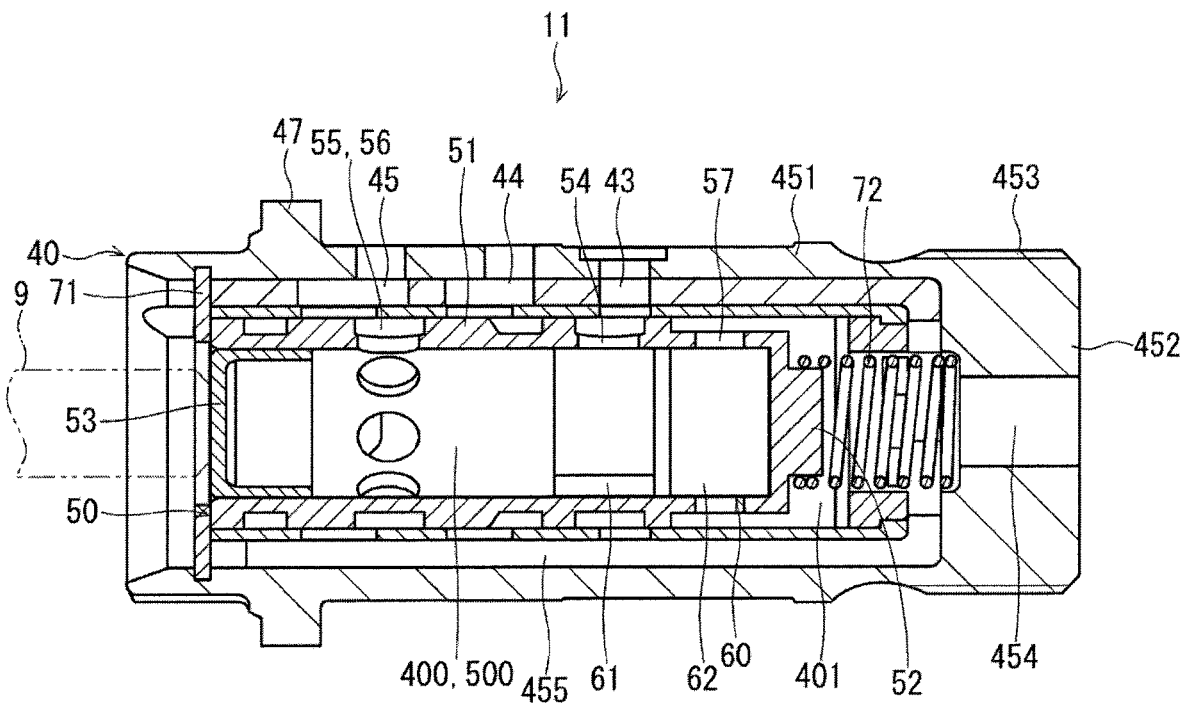
FIG. 10 is a cross-sectional view illustrating a passage change valve of a valve timing adjustment device according to a sixth embodiment of the present disclosure.

FIG. 10 illustrates a portion of a valve timing adjustment device according to a sixth embodiment of the present disclosure. The sixth embodiment differs from the first embodiment with respect to the configurations of the sleeve 40, the spool 50 and the check valve 60.

As illustrated in FIG. 10, the sleeve 40 is formed to have a three-tube structure. Similar to the second embodiment, the sleeve 40 has the sleeve tube 451, the sleeve bottom 452 and the threaded portion 453.

Each of the supply ports 43 is formed such that the supply port 43 connects between the outer wall and the inner wall of the sleeve tube 451. The supply ports 43 are connected to the oil pump 8.

Each of the primary control ports 44 is formed such that the primary control port 44 connects between the outer wall and the inner wall of the sleeve tube 451 on the retaining portion 47 side of the supply ports 43.

Each of the secondary control ports 45 is formed such that the secondary control port 45 connects between the outer wall and the inner wall of the sleeve tube 451 on the retaining portion 47 side of the primary control ports 44.

A drain port 454 is formed at a center of the sleeve bottom 452. Specifically, the drain port 454 is formed along the axis of the sleeve 40 at an end portion of the sleeve 40, which is located on the camshaft 3 side. The drain port 454 is formed such that the drain port 454 connects between the variable volume space 401 and the outside of the camshaft 3, that is, the drain port 454 connects between the variable volume space 401 and the outside of the valve timing adjustment device 10.

In the present embodiment, an intermediate passage 455 is formed within a range of a wall thickness of the sleeve tube 451. The intermediate passage 455 extends in the axial direction of the sleeve 40 and is communicated with the variable volume space 401. The primary control ports 44 and the secondary control ports 45 are communicated with the intermediate passage 455.

In the present embodiment, the spool cover 52 is formed integrally with the spool tube 51 in one piece. The spool bottom 53 is formed separately from the spool tube 51 and is press fitted into an opposite end of the spool tube 51, which is opposite from the spool cover 52.

Each of the recycle passages 57 is formed such that the recycle passage 57 connects between the outer wall and the inner wall of the spool tube 51 at a location that is adjacent to the spool cover 52. Each recycle passage 57 extends in the radial direction of the spool 50. The recycle passages 57 are connected to the drain port 454 through the variable volume space 401. Specifically, the recycle passages 57 are connected to the drain port 454 at the inside of the sleeve 40.

Each of the supply passages 54 is formed such that the supply passage 54 connects between the outer wall and the inner wall of the spool tube 51 at a location that is on the spool bottom 53 side of the recycle passages 57.

Each of the primary control passages 55 and a corresponding one of the secondary control passages 56 are formed integrally such that the primary control passage 55 and the secondary control passage 56 connect between the outer wall and the inner wall of the spool tube 51 at a location that is on the spool bottom 53 side of the supply passages 54.

The check valve 60 includes the supply check valve 61 and the recycle check valve 62.

The supply check valve 61 is placed in the pressure accumulation space 500 such that the supply check valve 61 corresponds to the supply passages 54. The recycle check valve 62 is placed in the pressure accumulation space 500 such that the recycle check valve 62 corresponds to the recycle passages 57.

In the present embodiment, when the spool 50 is positioned to contact the retaining portion 71 (see FIG. 10), the hydraulic oil is supplied to the advance chambers 202 through the secondary control ports 45, and the hydraulic oil in the retard chambers 201 flows to the intermediate passage 455 through the primary control ports 44. A portion of the hydraulic oil, which flows into the intermediate passage 455, is returned to the pressure accumulation space 500 through the variable volume space 401, the recycle passages 57 and the recycle check valve 62. Furthermore, another portion of the hydraulic oil, which flows into the intermediate passage 455, is discharged to the outside of the valve timing adjustment device 10 through the variable volume space 401 and the drain port 454.

Furthermore, when the spool 50 is positioned to contact the sleeve bottom 452, the hydraulic oil is supplied to the retard chambers 201 through the primary control ports 44, and the hydraulic oil in the advance chambers 202 flows to the intermediate passage 455 through the secondary control ports 45. A portion of the hydraulic oil, which flows into the intermediate passage 455, is returned to the pressure accumulation space 500 through the recycle passages 57 and the recycle check valve 62. Furthermore, another portion of the hydraulic oil, which flows into the intermediate passage 455, is discharged to the outside of the valve timing adjustment device 10 through the variable volume space 401 and the drain port 454.

Other than the points described above, the structure of the sixth embodiment is similar to that of the first embodiment. Therefore, the structure, which is the same as the structure of the first embodiment, can achieve the same advantages as those of the first embodiment.

As described above, the drain port 454 is formed along the axis of the sleeve 40 at the end portion of the sleeve 40, which is located on the camshaft 3 side. The recycle passages 57 extend in the radial direction of the spool 50. Therefore, there is provided the structure, in which the hydraulic oil received from the respective hydraulic chambers can be discharged to the camshaft 3 side.

Seventh Embodiment

Figure 11:
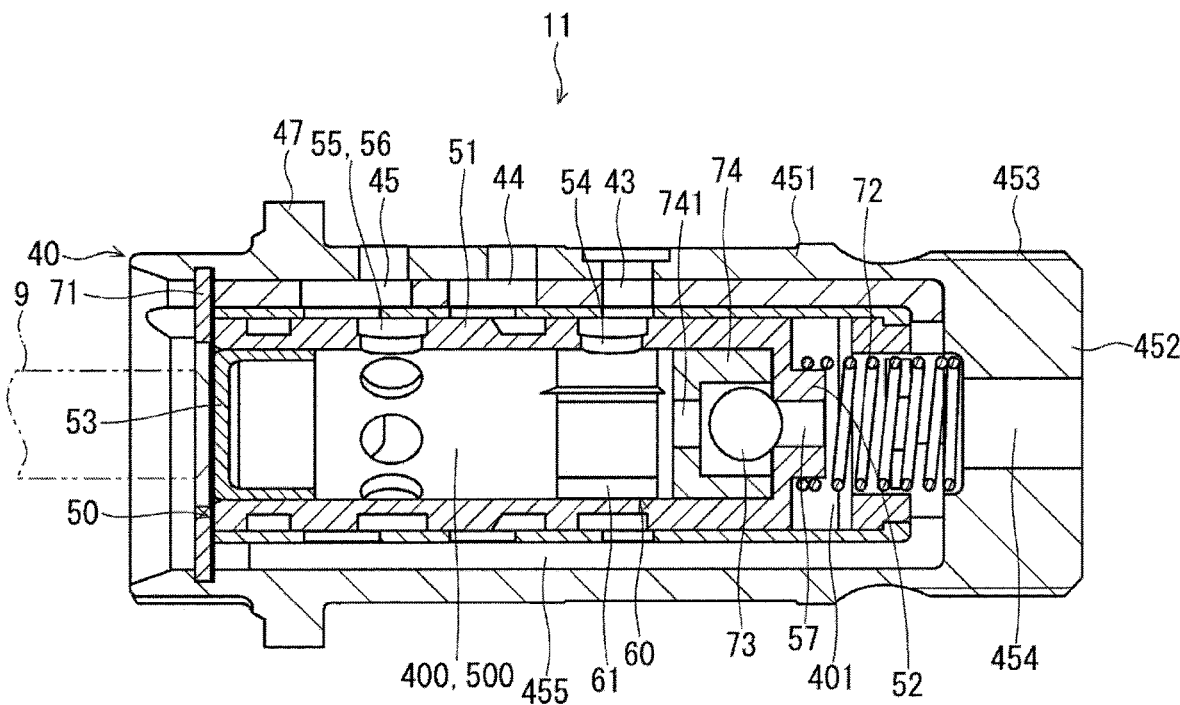
FIG. 11 is a cross-sectional view illustrating a passage change valve of a valve timing adjustment device according to a seventh embodiment of the present disclosure.

FIG. 11 illustrates a portion of a valve timing adjustment device according to a seventh embodiment of the present disclosure. The seventh embodiment differs from the sixth embodiment with respect to the configurations of the spool 50 and the check valve 60.

In the present embodiment, the recycle passage 57 is formed at a center of the spool cover 52. Specifically, the recycle passage 57 is formed along the axis of the spool 50 at an end portion of the spool 50 located on the camshaft 3 side.

The check valve 60 includes a recycle check valve 73 in place of the recycle check valve 62. The recycle check valve 73 is shaped in a spherical form and is made of, for example, metal. The recycle check valve 73 is placed in the pressure accumulation space 500 at a location that corresponds to the recycle passage 57.

A receiving portion 74 is installed at an end portion of the pressure accumulation space 500 located on the spool cover 52 side. The receiving portion 74 is shaped into a bottomed tubular form and is fitted into the inside of the spool tube 51 such that the receiving portion 74 receives the recycle check valve 73. The receiving portion 74 has a hole 741 that extends through a bottom of the receiving portion 74. An inside and an outside of the receiving portion 74 are communicated with each other through the hole 741.

The recycle check valve 73 is movable at the inside of the receiving portion 74.

When the hydraulic oil flows from the recycle passage 57 toward the pressure accumulation space 500, the recycle check valve 73 is moved toward the bottom of the receiving portion 74 in a direction away from the recycle passage 57 and the spool cover 52. In this way, the hydraulic oil can flow into the pressure accumulation space 500 through the recycle passage 57 and can move toward the supply check valve 61 relative to the receiving portion 74 through the hole 741. In contrast, when the hydraulic oil flows from the pressure accumulation space 500 toward the recycle passage 57, the recycle check valve 73 contacts the spool cover 52 such that the recycle check valve 73 closes the recycle passage 57. In this way, the outflow of the hydraulic oil from the pressure accumulation space 500 to the outside of the spool 50 through the recycle passage 57 is limited. Thus, the recycle check valve 73 enables the flow of the hydraulic oil from the recycle passage 57 to the pressure accumulation space 500 and limits the flow of the hydraulic oil from the pressure accumulation space 500 to the recycle passage 57.

In the present embodiment, when the spool 50 is positioned to contact the retaining portion 71, the hydraulic oil is supplied to the advance chambers 202 through the secondary control ports 45, and the hydraulic oil in the retard chambers 201 flows to the intermediate passage 455 through the primary control ports 44. A portion of the hydraulic oil, which flows into the intermediate passage 455, is returned to the pressure accumulation space 500 through the variable volume space 401, the recycle passage 57 and the recycle check valve 73. Furthermore, another portion of the hydraulic oil, which flows into the intermediate passage 455, is discharged to the outside of the valve timing adjustment device 10 through the variable volume space 401 and the drain port 454.

Furthermore, when the spool 50 is positioned to contact the sleeve bottom 452, the hydraulic oil is supplied to the retard chambers 201 through the primary control ports 44, and the hydraulic oil in the advance chambers 202 flows to the intermediate passage 455 through the secondary control ports 45. A portion of the hydraulic oil, which flows into the intermediate passage 455, is returned to the pressure accumulation space 500 through the recycle passage 57 and the recycle check valve 73. Furthermore, another portion of the hydraulic oil, which flows into the intermediate passage 455, is discharged to the outside of the valve timing adjustment device 10 through the variable volume space 401 and the drain port 454.

Other than the points described above, the structure of the seventh embodiment is similar to that of the sixth embodiment. Therefore, the structure, which is the same as the structure of the sixth embodiment, can achieve the same advantages as those of the sixth embodiment.

As described above, the drain port 454 is formed along the axis of the sleeve 40 at the end portion of the sleeve 40, which is located on the camshaft 3 side. The recycle passage 57 is formed along the axis of the spool 50 at an end portion of the spool 50 located on the camshaft 3 side. Therefore, similar to the sixth embodiment, there is provided the structure, in which the hydraulic oil received from the respective hydraulic chambers can be discharged to the camshaft 3 side.

OTHER EMBODIMENTS

The above embodiments illustrate the example in which the sleeve 40 and the spool 50 of the passage change valve 11 are placed at the center of the vane rotor 30. In another embodiment of the present disclosure, the passage change valve 11 may be placed at a location, such as the outside of the housing 20, which is other than the center of the vane rotor 30.

Furthermore, in, for example, the first embodiment, the drain port is formed such that at least a portion of the drain port is placed on the side of the recycle passage where the radially outer side of the spool 50 is placed. Alternatively, in another embodiment of the present disclosure, as long as the drain port can communicate with the recycle passage at the inside of the sleeve 40, the drain port may not be formed on the side of the recycle passage where the radially outer side of the spool 50 is placed.

Furthermore, in another embodiment of the present disclosure, the housing 20 and the crankshaft 2 may be connected by a transmission member, such as a belt, in place of the chain 6.

The above embodiments illustrate the example, in which the crankshaft 2 serves as the first shaft, and the camshaft 3 serves as the second shaft. In another embodiment of the present disclosure, the crankshaft 2 may serve as the second shaft, and the camshaft 3 may serve as the first shaft. Specifically, the vane rotor 30 may be fixed to the end of the crankshaft 2, and the housing 20 may be rotated synchronously with the camshaft 3.

The valve timing adjustment device 10 of the present disclosure may adjust the valve timing of the exhaust valves 5 of the engine 1.

As discussed above, the present disclosure is not limited to the above embodiments and can be implemented in various forms without departing from the scope thereof.

The present disclosure has been described with reference to the embodiments. However, the present disclosure should not be limited to the embodiments and the structures described therein. The present disclosure covers various modifications and variations on the scope of equivalents. Also, various combinations and forms as well as other combinations, each of which includes only one element or more or less of the various combinations, are also within the scope and spirit of the present disclosure.

What is claimed is:

1. A valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft, wherein one of the drive shaft and the driven shaft is defined as a first shaft while the other one of the drive shaft and the driven shaft is defined as a second shaft, the valve timing adjustment device comprising:
    a housing that is configured to be rotated synchronously with the first shaft, wherein the housing is configured to be fitted to an end portion of the second shaft and is configured to be rotatably supported by the second shaft;
    a vane rotor that is configured to be fixed to the end portion of the second shaft and includes a vane that partitions an inside space of the housing into a primary hydraulic chamber and a secondary hydraulic chamber while the primary hydraulic chamber is located on one side of the vane in a circumferential direction, and the secondary hydraulic chamber is located on the other side of the vane in the circumferential direction, wherein the vane rotor is configured to be rotated relative to the housing depending on a pressure of hydraulic oil supplied from a hydraulic oil supply source to the primary hydraulic chamber and a pressure of the hydraulic oil supplied from the hydraulic oil supply source to the secondary hydraulic chamber;
    a sleeve that is shaped in a tubular form and includes:
        a supply port, which is communicated with the hydraulic oil supply source;
        a primary control port, which is communicated with the primary hydraulic chamber;
        a secondary control port, which is communicated with the secondary hydraulic chamber; and
        a drain port, which is communicated with an outside of the valve timing adjustment device;
    a spool that is shaped in a tubular form and is configured to reciprocate in an axial direction of the spool at an inside of the sleeve, wherein the spool includes:
        a pressure accumulation space, which is formed at an inside of the spool;
        a supply passage, which is configured to connect between the pressure accumulation space and the supply port;
        a primary control passage, which is configured to connect between the pressure accumulation space and the primary control port;
        a secondary control passage, which is configured to connect between the pressure accumulation space and the secondary control port; and
        a recycle passage, which is configured to connect between the primary control port or the secondary control port and the pressure accumulation space; and
    a recycle check valve that is placed at the inside of the spool and is configured to enable a flow of the hydraulic oil from the recycle passage toward the pressure accumulation space and is configured to limit a flow of the hydraulic oil from the pressure accumulation space toward the recycle passage, wherein the recycle passage and the drain port are connected with each other at the inside of the sleeve; and
    the recycle check valve is resiliently deformable in a radial direction of the spool.

2. The valve timing adjustment device according to claim 1, wherein at least a portion of the drain port is placed on a side of the recycle passage where a radially outer side of the spool is placed.

3. The valve timing adjustment device according to claim 1, wherein the drain port is communicated with the outside of the valve timing adjustment device through a location between the sleeve and the spool.

4. The valve timing adjustment device according to claim 1, wherein the recycle passage is located between the primary control passage and the secondary control passage in an axial direction of the sleeve.

5. The valve timing adjustment device according to claim 1, wherein:
    the recycle passage is one of two recycle passages, which are placed one after another in the axial direction of the sleeve; and
    the primary control passage and the secondary control passage are formed integrally at a location between the two recycle passages.

6. The valve timing adjustment device according to claim 1, wherein the drain port is communicated with the outside of the valve timing adjustment device through a sleeve-inside passage that is a passage formed in a range of a wall thickness of the sleeve.

7. The valve timing adjustment device according to claim 1, wherein the drain port is communicated with the outside of the valve timing adjustment device through a sleeve-outside passage that is a passage formed at the second shaft or the vane rotor.

8. The valve timing adjustment device according to claim 1, wherein:
    the drain port is formed along an axis of the sleeve at an end portion of the sleeve that is located on the second shaft side; and
    the recycle passage extends in a radial direction of the spool.

9. The valve timing adjustment device according to claim 1, wherein the sleeve is placed at a center of the vane rotor.

* * * * *